US008412915B2

(12) United States Patent
Master et al.

(10) Patent No.: US 8,412,915 B2
(45) Date of Patent: *Apr. 2, 2013

(54) APPARATUS, SYSTEM AND METHOD FOR CONFIGURATION OF ADAPTIVE INTEGRATED CIRCUITRY HAVING HETEROGENEOUS COMPUTATIONAL ELEMENTS

(75) Inventors: Paul L. Master, Sunnyvale, CA (US);
Stephen J. Smith, Los Gatos, CA (US);
John Watson, Edgewood, WA (US)

(73) Assignee: Altera Corporation, San Jose, CA (US)

( * ) Notice: Subject to any disclaimer, the term of this patent is extended or adjusted under 35 U.S.C. 154(b) by 2110 days.

This patent is subject to a terminal disclaimer.

(21) Appl. No.: 09/997,530

(22) Filed: Nov. 30, 2001

(65) Prior Publication Data
US 2003/0102889 A1 Jun. 5, 2003

(51) Int. Cl.
*G06F 15/00* (2006.01)
(52) U.S. Cl. .......................................................... 712/15
(58) Field of Classification Search .................... 712/15, 712/35, 36, 29
See application file for complete search history.

(56) References Cited

U.S. PATENT DOCUMENTS

| | | | |
|---|---|---|---|
| 3,665,171 A | | 5/1972 | Morrow |
| 4,302,775 A | * | 11/1981 | Widergren et al. ...... 375/240.06 |
| 4,380,046 A | | 4/1983 | Fung |
| 4,649,512 A | | 3/1987 | Nukiyama |
| 4,694,416 A | | 9/1987 | Wheeler et al. |
| 4,758,985 A | | 7/1988 | Carter |
| 4,760,525 A | * | 7/1988 | Webb ................................. 712/2 |
| 4,811,214 A | * | 3/1989 | Nosenchuck et al. .......... 712/11 |
| 4,870,302 A | | 9/1989 | Freeman |
| 4,905,231 A | | 2/1990 | Leung et al. |

(Continued)

FOREIGN PATENT DOCUMENTS

| | | |
|---|---|---|
| EP | 0 668 659 A2 | 8/1995 |
| JP | 63147258 | 6/1988 |

(Continued)

OTHER PUBLICATIONS

Zhang, Hui et al., "A 1V Heterogeneous Reconfigurable Processor IC for Baseband Wireless Applications", 2000 IEEE Solid-State Circuits Conference, Feb. 7, 2000, pp. 68-69, XP010378803, ISBN: 07803-5853-8/00.

(Continued)

*Primary Examiner* — Keith Vicary
(74) *Attorney, Agent, or Firm* — Nixon Peabody LLP

(57) ABSTRACT

The present invention concerns configuration of a new category of integrated circuitry for adaptive or reconfigurable computing. The preferred adaptive computing engine (ACE) IC includes a plurality of heterogeneous computational elements coupled to an interconnection network. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative to configure and reconfigure the plurality of heterogeneous computational elements for a plurality of different functional modes, including linear algorithmic operations, non-linear algorithmic operations, finite state machine operations, controller operations, memory operations, and bit-level manipulations. The preferred system embodiment includes an ACE integrated circuit coupled with the configuration information needed to provide an operating mode. Preferred methodologies include various means to generate and provide configuration information for various operating modes.

124 Claims, 13 Drawing Sheets

U.S. PATENT DOCUMENTS

| | | | |
|---|---|---|---|
| 5,099,418 A | 3/1992 | Pian et al. | |
| 5,144,166 A | 9/1992 | Camarota et al. | |
| 5,165,023 A | 11/1992 | Gifford | |
| 5,177,700 A | 1/1993 | Göckler | |
| 5,218,240 A | 6/1993 | Camarota et al. | |
| 5,245,227 A | 9/1993 | Furtek et al. | |
| 5,336,950 A | 8/1994 | Popli et al. | |
| 5,388,062 A | 2/1995 | Knutson | |
| 5,428,754 A | 6/1995 | Baldwin | |
| 5,450,557 A | 9/1995 | Kopp et al. | |
| 5,475,856 A | 12/1995 | Kogge | |
| 5,479,055 A | 12/1995 | Eccles | |
| 5,519,694 A * | 5/1996 | Brewer et al. | 370/351 |
| 5,646,545 A | 7/1997 | Trimberger et al. | |
| 5,701,398 A | 12/1997 | Glier et al. | |
| 5,729,754 A | 3/1998 | Estes | |
| 5,737,631 A | 4/1998 | Trimberger | |
| 5,768,561 A * | 6/1998 | Wise | 710/63 |
| 5,771,362 A | 6/1998 | Bartkowiak et al. | |
| 5,784,699 A | 7/1998 | McMahon et al. | |
| 5,794,062 A * | 8/1998 | Baxter | 712/30 |
| 5,802,278 A | 9/1998 | Isfeld et al. | |
| 5,838,894 A | 11/1998 | Horst | |
| 5,873,045 A * | 2/1999 | Lee et al. | 455/556.2 |
| 5,886,537 A | 3/1999 | Macias et al. | |
| 5,892,962 A | 4/1999 | Cloutier | |
| 5,910,733 A | 6/1999 | Bertolet et al. | |
| 5,956,518 A | 9/1999 | DeHon et al. | |
| 5,963,048 A | 10/1999 | Harrison et al. | |
| 6,005,943 A * | 12/1999 | Cohen et al. | 380/30 |
| 6,018,783 A | 1/2000 | Chiang | |
| 6,047,115 A | 4/2000 | Mohan et al. | |
| 6,112,218 A | 8/2000 | Gandhi et al. | |
| 6,119,178 A | 9/2000 | Martin et al. | |
| 6,128,307 A | 10/2000 | Brown | |
| 6,134,605 A | 10/2000 | Hudson et al. | |
| 6,134,629 A | 10/2000 | L'Ecuyer | |
| 6,154,492 A | 11/2000 | Araki et al. | |
| 6,157,997 A | 12/2000 | Oowaki et al. | |
| 6,173,389 B1 | 1/2001 | Pechanek et al. | |
| 6,202,189 B1 | 3/2001 | Hinedi et al. | |
| 6,272,616 B1 | 8/2001 | Fernando et al. | |
| 6,279,020 B1 | 8/2001 | Dujardin et al. | |
| 6,281,703 B1 * | 8/2001 | Furuta et al. | 326/40 |
| 6,282,627 B1 | 8/2001 | Wong et al. | |
| 6,326,806 B1 | 12/2001 | Fallside et al. | |
| 6,353,841 B1 | 3/2002 | Marshall et al. | |
| 6,381,293 B1 | 4/2002 | Lee et al. | |
| 6,408,039 B1 | 6/2002 | Ito | |
| 6,426,649 B1 | 7/2002 | Fu et al. | |
| 6,433,578 B1 | 8/2002 | Wasson | |
| 6,467,009 B1 | 10/2002 | Winegarden et al. | |
| 6,469,540 B2 | 10/2002 | Nakaya | |
| 6,483,343 B1 | 11/2002 | Faith et al. | |
| 6,538,470 B1 | 3/2003 | Langhammer et al. | |
| 6,556,044 B2 | 4/2003 | Langhammer et al. | |
| 6,604,189 B1 | 8/2003 | Zemlyak et al. | |
| 6,611,906 B1 | 8/2003 | McAllister et al. | |
| 6,618,777 B1 | 9/2003 | Greenfield | |
| 6,647,429 B1 | 11/2003 | Semal | |
| 6,675,284 B1 | 1/2004 | Warren | |
| 6,684,319 B1 | 1/2004 | Mohamed et al. | |
| 6,694,380 B1 | 2/2004 | Wolrich et al. | |
| 6,751,723 B1 | 6/2004 | Kundu et al. | |
| 6,760,833 B1 | 7/2004 | Dowling | |
| 6,807,590 B1 | 10/2004 | Carlson et al. | |
| 6,854,002 B2 | 2/2005 | Conway et al. | |
| 6,859,434 B2 | 2/2005 | Segal et al. | |
| 6,883,074 B2 | 4/2005 | Lee et al. | |
| 6,907,598 B2 | 6/2005 | Fraser | |
| 6,941,336 B1 | 9/2005 | Mar | |
| 6,980,515 B1 | 12/2005 | Schunk et al. | |
| 6,986,142 B1 | 1/2006 | Ehlig et al. | |
| 7,320,062 B2 * | 1/2008 | Master et al. | 712/15 |
| 2002/0133688 A1 | 9/2002 | Lee et al. | |
| 2002/0167997 A1 | 11/2002 | Kim et al. | |
| 2002/0184275 A1 | 12/2002 | Dutta et al. | |
| 2003/0023649 A1 | 1/2003 | Kamiya et al. | |
| 2003/0074473 A1 | 4/2003 | Pham et al. | |
| 2003/0131162 A1 | 7/2003 | Secatch et al. | |
| 2003/0229864 A1 | 12/2003 | Watkins | |
| 2004/0086027 A1 | 5/2004 | Shattil | |
| 2004/0133745 A1 | 7/2004 | Ramchandran | |
| 2004/0174932 A1 | 9/2004 | Warke et al. | |
| 2005/0044344 A1 | 2/2005 | Stevens | |
| 2005/0166073 A1 | 7/2005 | Lee | |
| 2005/0190871 A1 | 9/2005 | Sedarat | |
| 2006/0031660 A1 * | 2/2006 | Master et al. | 712/15 |

FOREIGN PATENT DOCUMENTS

| | | |
|---|---|---|
| JP | 7064789 | 3/1995 |
| JP | 10254696 | 9/1998 |
| WO | WO 00/69073 A1 | 11/2000 |

OTHER PUBLICATIONS

Alsolaim, A et al., "Architecture and Application of a Dynamically Reconfigurable Hardware Array for Future Mobile Communication Systems", Field Programmable Custom Computing Machines, 2000 IEEE Symposium, Napa Valley, Los Alamitos, CA Apr. 17-19, 2000, IEEE Comput. Soc., Apr. 17, 2000, pp. 205-214, XP010531939, ISBN 0-7695-0871-5/00.

Becker, J et al., "Design and Implementation of a Coarse-Grained Dynamically Reconfigurable Hardware Architecture", VLSI 2001, Proceedings IEEE Computer Soc. Workshop, Apr. 19-20, 2001, Piscataway, NJ, USA, Apr. 19, 2001, pp. 41-46, XP010541755, ISBN: 0-7695-1056-6/01.

Abnous A. et al.: "Ultra-low-power domain-specific multimedia processors", VLSI Signal Processing, IX, 1996, IEEE Workshop in San Francisco, CA, USA, Oct. 30-Nov. 1, 1996, Oct. 30, 1996. pp. 461-470: XP010199037, ISBN: 0-7803-3134-6.

Baumgarte, V. et al., "PACT XPP—A Self-Reconfigurable Data Processing Architecture", NN, Jun. 25, 2001, XP002256066.

Hartenstein, R. "Coarse Grain Reconfigurable Architectures", Design Automation Conference, 2001. Proceedings of the ASP-DAC 2001, Asia and South Pacific Jan. 30-Feb. 2, 2001. Piscataway. NJ, US, IEEE Jan. 30, 2001, pp. 564-569, XP010537867, ISBN: 0-7803-6833-6.

Altera Apex 20K 1999.

Andraka Consulting Group, "Distributed Arithmetic," Obtained from: http://www.fpga-guru.com/distribu.htm (1998-2000).

Computer Organization and Design $2^{nd}$ Edition, Hennessy, Morgan Kaufmann Publishers, pp. 569-70 (1998).

Free On-Line Dictionary of Computing. ©1995-2000 www.foldoc.org search terms: cache, operating system, Internet, DMA, interrupt.

Hanna et al., "A Normalized Backpropagation Learning Algorithm for Multilayer Feed-Forward Neural Adaptive Filters," *Neural Networks for Signal Processing XI*, Proceedings of the 2001 IEEE Signal Processing Society Workshop pp. 63-72 (Sep. 2001).

Janweijer et al., "A Compact Robin Using the SHarc (CRUSH)," Obtained from: http://www.nikhef.nl/~peterj/Crush/CRUSH-hw.pdf (Sep. 1998).

Rajagopalan et al., "A Flexible Multiplication Unit for an FPGA Logic Block," *Circuits and Systems* 4:546-9 (2001).

Xilinx Data Book 1998.

Xilinx Virtex 1.1 1998.

Xilinx Virtex 2.2 2000.

U.S. Appl. No. 11/962,979 Office Action Date Mailed Sep. 22, 2009.
U.S. Appl. No. 11/241,009 Office Action Date Mailed Feb. 7, 2007.
U.S. Appl. No. 09/997,987 Office Action Date Mailed Oct. 19, 2004.
U.S. Appl. No. 10/990,800 Office Action Date Mailed Feb. 25, 2009.
U.S. Appl. No. 10/990,800 Office Action Date Mailed Feb. 22, 2010.
U.S. Appl. No. 10/990,800 Office Action Date Mailed Sep. 13, 2007.
U.S. Appl. No. 10/990,800 Office Action Date Mailed Jun. 6, 2008.
U.S. Appl. No. 10/990,800 Office Action Date Mailed Oct. 15, 2009.
U.S. Appl. No. 09/815,122 Office Action Date Mailed Dec. 29, 2003.
U.S. Appl. No. 10/384,486 Office Action Date Mailed Sep. 6, 2005.
U.S. Appl. No. 10/384,486 Office Action Date Mailed Aug. 31, 2006.
U.S. Appl. No. 10/384,486 Office Action Date Mailed Apr. 13, 2007.
U.S. Appl. No. 10/384,486 Office Action Date Mailed Aug. 3, 2007.

* cited by examiner

ADAPTIVE COMPUTING ENGINE (ACE)

APPARATUS, SYSTEM AND METHOD FOR CONFIGURATION OF ADAPTIVE INTEGRATED CIRCUITRY HAVING HETEROGENEOUS COMPUTATIONAL ELEMENTS

FIELD OF THE INVENTION

The present invention relates, in general, to integrated circuits and systems of integrated circuits. More particularly, the present invention relates to an apparatus, method and system for configuration of adaptive integrated circuitry having fixed, application specific computational elements, for the provision or creation of functionality of the adaptive integrated circuitry.

CROSS-REFERENCE TO A RELATED APPLICATION

This application is related to Paul L. Master et al., U. S. patent application Ser. No. 09/815,122, entitled "Adaptive Integrated Circuitry With Heterogeneous And Reconfigurable Matrices Of Diverse And Adaptive Computational Units Having Fixed, Application Specific Computational Elements", filed Mar. 22, 2001, commonly assigned to Quick-Silver Technology, Inc., and incorporated by reference herein, with priority claimed for all commonly disclosed subject matter (the "related application").

BACKGROUND OF THE INVENTION

The related application discloses a new form or type of integrated circuitry which effectively and efficiently combines and maximizes the various advantages of processors, application specific integrated circuits ("ASICs"), and field programmable gate arrays ("FPGAs"), while minimizing potential disadvantages. The related application illustrates a new form or type of integrated circuit ("IC"), referred to as an adaptive computing engine ("ACE"), which provides the programming flexibility of a processor, the post-fabrication flexibility of FPGAs, and the high speed and high utilization factors of an ASIC. This ACE integrated circuitry is readily reconfigurable, is capable of having corresponding, multiple modes of operation, and further minimizes power consumption while increasing performance, with particular suitability for low power applications, such as for use in hand-held and other battery-powered devices.

This ACE integrated circuitry, however, without something more, is essentially an empty or "blank" device. More particularly, configuration information is required to generate, in advance or in real-time (or potentially at a slower rate), the configurations and reconfigurations which provide and create one or more operating modes for the ACE circuit, such as wireless communication, radio reception, personal digital assistance ("PDA"), MP3 music playing, or any other desired functions.

Various concerns and needs also arise from the capability of the ACE architecture to be configured and reconfigured for one or more operational modes. For example, prior to a configuration (and/or reconfiguration) of a particular ACE IC in a device, the capabilities of that ACE should be determined, to avoid a download or reception of a potential configuration which may alter or harm pre-existing configurations or other functionalities of the device.

Security for configuration and reconfiguration is also of paramount importance. Given that such configurations are capable of altering the function of the ACE architecture, authorization and security measures should be implemented to avoid potentially destructive or other illicit configurations, such as viruses, worms and other detrimental contagions. Authorization and security measures are also important for the protection of intellectual property, such as copyrighted material, and other information which may be confidential or otherwise restricted. Various forms of monitoring, tracking and other record keeping may also be appropriate for determining and accounting for the various configuration possibilities.

As a consequence, a need remains for an apparatus, method and system for providing configuration information for adaptive integrated circuitry, for the provision or creation of one or more operating modes or other functionality of ACE circuitry and other ACE devices. Such a method and system should be capable of determining ACE capability, should provide secure and authorized configurations, and should provide appropriate monitoring of configuration and content usage.

SUMMARY OF THE INVENTION

The adaptive computing engine ("ACE") circuit of the present invention, for adaptive or reconfigurable computing, includes a plurality of differing, heterogeneous computational elements coupled to an interconnection network (rather than the same, homogeneous repeating and arrayed units of FPGAs). The plurality of heterogeneous computational elements include corresponding computational elements having fixed and differing architectures, such as fixed architectures for different functions such as memory, addition, multiplication, complex multiplication, subtraction, configuration, reconfiguration, control, input, output, routing, and field programmability. In response to configuration information, the interconnection network is operative, in advance, in real-time or potentially slower, to configure and reconfigure the plurality of heterogeneous computational elements for a plurality of different functional modes, including linear algorithmic operations, non-linear algorithmic operations, finite state machine operations, memory operations, and bit-level manipulations. In turn, this configuration and reconfiguration of heterogeneous computational elements, forming various computational units and adaptive matrices, generates the selected, higher-level operating mode of the ACE integrated circuit, for the performance of a wide variety of tasks.

The preferred system embodiment of the present invention includes such an ACE integrated circuit coupled with one or more sets of configuration information. Other, higher-level system embodiments are also illustrated, including wireline and wireless devices, consumer and automobile electronics, network infrastructure equipment, and so on. This configuration information provides a selected operating (or functional) mode for the ACE; in the absence of such configuration information, the ACE would be functionless.

Various apparatuses, methods and systems are also illustrated for generating and providing configuration information for an ACE integrated circuit. In addition, the systems and methods of the present invention are capable of determining ACE reconfiguration capacity or capability, providing secure and authorized configurations, and providing appropriate monitoring of configuration and content usage.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
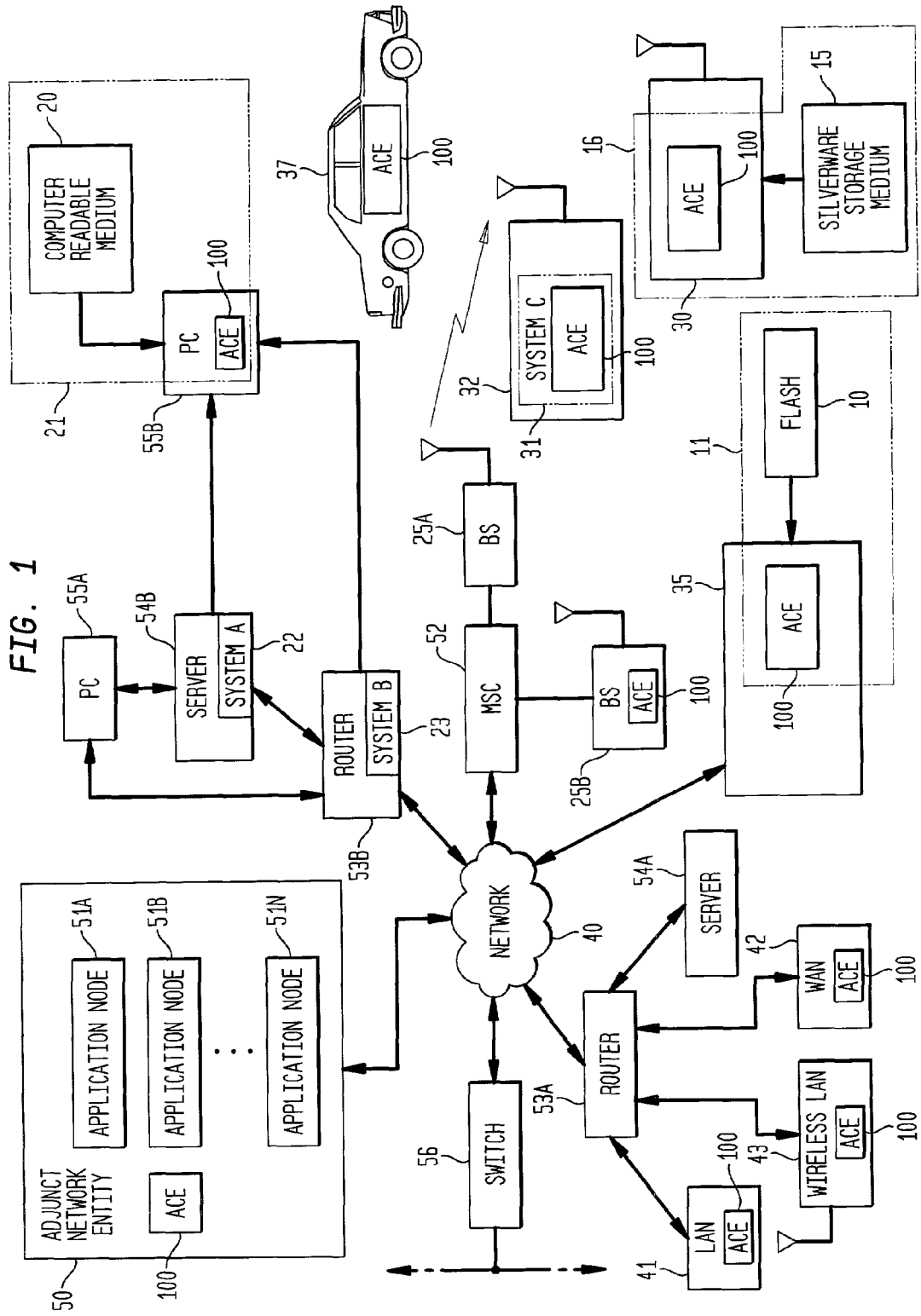
FIG. 1 is a block diagram illustrating a plurality of system embodiments in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As indicated above, a need remains for an apparatus, method and system for providing configuration information for adaptive integrated circuitry, to provide one or more operating modes of adaptive computing engine (ACE) circuitry and other devices incorporating ACE technology. Such an apparatus, method and system are provided in accordance with the present invention, combining configuration information with an ACE circuit (ACE IC), for the provision of one or more selected operating modes, such as wireless communication, radio reception, personal digital assistance ("PDA"), MP3 music playing, or any other desired functions or operations. In addition, the apparatus, system and method of the present invention are capable of determining ACE reconfiguration capacity, providing secure and authorized configurations, and providing appropriate monitoring of configuration and content usage.

The systems and method of the present invention utilize a new form of integrated circuitry referred to as an ACE (adaptive computing engine). The ACE architecture utilizes a plurality of fixed and differing computational elements, such as (without limitation) correlators, multipliers, complex multipliers, adders, demodulators, interconnection elements, routing elements, combiners, finite state machine elements, reduced instruction set (RISC) processing elements, bit manipulation elements, input/output (I/O) and other interface elements, and the lower-level "building blocks" which form these units, which may be configured and reconfigured, in response to configuration information, to form the functional blocks (computational units and matrices) which may be needed, at any given or selected time, to perform higher-level functions and, ultimately, to execute or perform the selected operating mode, such as to perform wireless communication functionality. The methodology and systems of the present invention also minimize power consumption and are especially suitable for low power applications, such as for use in hand-held and other battery-powered devices.

FIG. 1 is a block diagram illustrating a plurality of system embodiments in accordance with the present invention. Referring to FIG. 1, as indicated above (and as discussed in greater detail below), the preferred system of the present invention consists of an ACE 100 coupled or combined with configuration information, and may be implemented in a wide variety of embodiments including, for example, within wireless devices 30 and 32, wireline device 35, computers 55, consumer electronics, automobile electronics 37, and network infrastructure equipment, such as servers 54, routers 53, local area network (LAN) 41, wireless LAN 43, wide area network (WAN) 42, adjunct network entity 50, switching systems 52 and 56, wireless base stations 25, and any other electronic device.

As indicated above, the terminology "configuration information", as used herein, should be understood generally to have and include its linguistic, plural connotation, i.e., configuration information is a plurality of information bits, groups or sets of information, namely, a "plurality" of configuration information. For example, "configuration information" may be viewed as being a set of configuration information comprised of a plurality of subsets, such subsets being first configuration information, second configuration information, third configuration information, and so on, through $n^{th}$ configuration information. Although a subset of configuration information may be singular (one bit of information contained in the subset), each such subset of configuration information is also generally plural, typically including more information than may be encoded by a single bit, such as 8, 16, 32 or 64 information bits.

The configuration information may also exist in a variety of forms, and at any given time, may have a stored (or fixed) nature, or may have a transient or temporal nature. For example, as illustrated in FIG. 1, configuration information may be stored as a binary (bit) file in a flash memory 10 (for device 35) or in a computer or readable medium 20 (such as a CD-ROM, other optical drive, computer memory, hard drive or floppy disk) for computer 55B. As discussed in greater detail below, such configuration information may also be interdigitated, intertwined or otherwise combined with data, forming what is referred to and defined herein as "silverware" or a "silverware" module, and stored as a binary (bit) file in a silverware storage media 15. The configuration information may also occur transiently and across time, for example, when wirelessly downloaded from a base station 25A to a wireless device 32 (such as a mobile station or other mobile telephone) over an air interface, or when wireline downloaded from a server 54 to a computer (PC) 55.

Referring to FIG. 1 in greater detail, a plurality of networks are illustrated, including local area network ("LAN") 41, wireless LAN 43, wide area network ("WAN") 42, and, more generally, network 40, such as a public switched telephone network ("PSTN") or an internet. Coupled to the various networks are routers 53A and 53B, servers 54A and 54B, wireline switching center 56, mobile switching center ("MSC") 52, with further connection or couplability to wireless base stations (or other wireless transceivers) 25A and 25B, wireline device 35, computers 55A and 55B, and adjunct network entity 50. As known in the art, these various devices may be connected via trunking, optical and other signaling lines to each other and to broader networks (such as to a PSTN or internet), with multiple communication connections to other locations, such as providing a link to a satellite (not separately illustrated) and providing other wireless links (air interfaces). Router 53B, server 54B, base station 25B, and computer 55B are separately designated (with "B") to illustrate the potential inclusion of an ACE 100 (and the systems of the present invention) within such infrastructure equipment, and within LAN 41, WAN 42, wireless LAN 43, adjunct network entity 50, in addition to inclusion within consumer, automotive, and mobile electronics. Also, while the wireline and mobile switching centers 56 and 52 are usually physically separated due to regulatory and other historical or legacy reasons, these switching centers may also be combined into one or more switching centers having both wireline and wireless functionalities.

These various server, switching, routing and other entities may also be connected through network 40 to one or more intelligent network devices referred to as an adjunct network entities, such as adjunct network entity 50, which may be an additional type of server, database, a service control point ("SCP"), a service circuit node ("SCN") (also referred to as a service node ("SN")), an intelligent peripheral ("IP"), a gateway, or another intelligent network device. One or more adjunct network entities 50 are preferably connected or coupled to a network 40, for direct or indirect connection to wireline switching center 56, MSC 52, LAN 41, WAN 42, wireless LAN 43, routers 53 and servers 54. In the preferred embodiment, an adjunct network entity 50 provides a node or platform for particular applications ("application nodes") 51, illustrated as application nodes 51A, 51B through 51N, to perform various functions such as providing downloads of configuration information, authentication, security, authorization, and compatibility evaluation. In addition to inclusion within an adjunct network entity 50, these various application nodes 51 may also be distributed among or included within the other various devices, such as within one or more servers 54. For example, one server 54 may be utilized to provide configuration information, with an adjunct network entity 50 utilized for authentication and security, with tracking and accounting occurring at yet another server 54 or computer 55.

For purposes of explanation and not limitation, the various systems of the present invention, as illustrated in FIG. 1, include: system 11 (ACE 100 of wireline device 35 with configuration information in FLASH 10); system 16 (ACE 100 of wireless device 30 with configuration information in silverware storage medium 15); system 31 (ACE 100 of wireless device 32 with configuration information stored in a form of memory (separately illustrated in FIG. 2), such as RAM or a matrix interconnection network ('MIN"), discussed below; system 21 (ACE 100 of computer 55B with configuration information stored in computer readable medium 20; system 22 (ACE 100 of server 54B with configuration information stored in a form of memory (separately illustrated in FIG. 2); and system 23 (ACE 100 of router 53B with configuration information stored in a memory (separately illustrated in FIG. 2). As may be apparent, a system of the present invention may be embodied within any device or other article, in addition to those illustrated (e.g., LAN 41, WAN 42, wireless LAN 43 and adjunct network entity 50), which include both an ACE 100 and configuration information for the provision of a corresponding operating mode, and may otherwise be co-extensive with any particular apparatus or other embodiment.

Other network or distribution-level systems are also included within the scope of the present invention. Exemplary network systems may include one or more application nodes 51, in an adjunct network entity 50 or other server 54, which provide configuration information or silverware modules (configuration information coupled with data) for use by an ACE 100. Such network or distribution level systems, in response to a request from or on behalf of an ACE 100, in the preferred embodiment, may provide one or more of the following: one or more sets of configuration information; content or other data modified for use with configuration information; silverware modules combining configuration information with corresponding data or other content; configuration information tailored or watermarked for a unique device, and/or encryption of configuration information or silverware modules.

Distributed systems are also within the scope of the present invention, as configuration information does not need to be local to any given ACE 100 device. For example, configuration information or silverware may be stored across a network 40, such as between and among application nodes 51, adjunct network entity 50, other server 54, and the other illustrated elements of FIG. 1. For such distributed systems, the ACE 100 may only be configured, such as through an operating system ("OS"), to obtain the configuration information, such as through one of these network devices.

Figure 2:
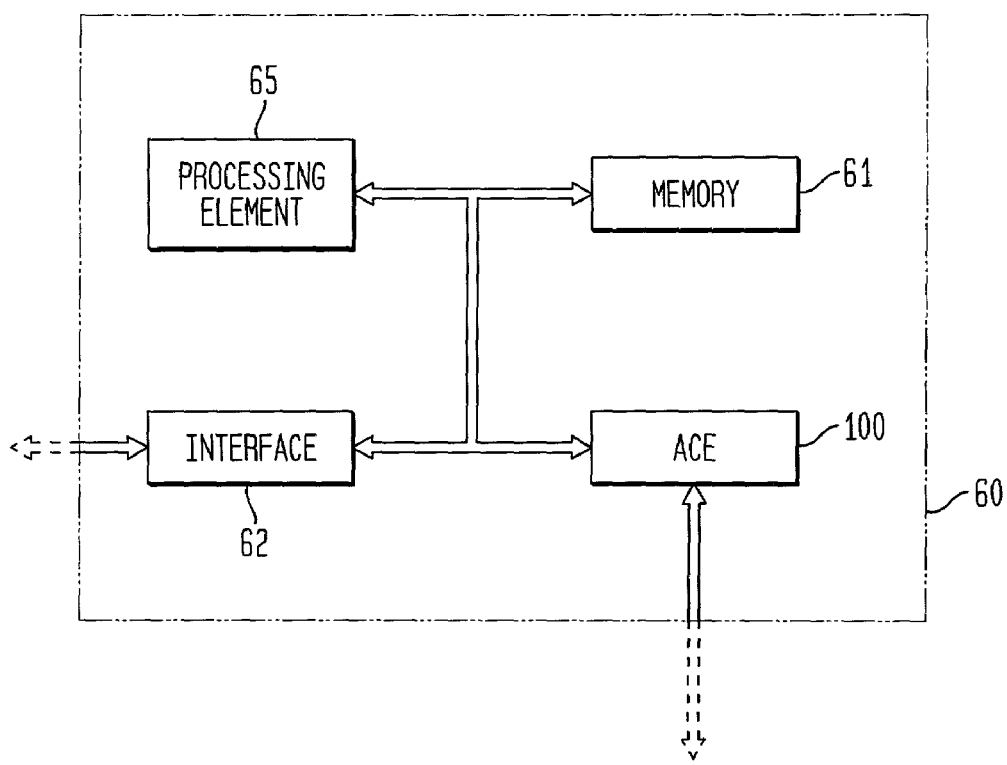
FIG. 2 is a block diagram illustrating an integrated system embodiment in accordance with the present invention.

FIG. 2 is a block diagram illustrating an integrated system embodiment 60 in accordance with the present invention. The system 60 is preferably implemented as a single integrated circuit (system on a chip or "SOC"). The system 60 includes an ACE 100, and may also include a memory 61, an interface 62 and one or more other processing elements 65. Such a system 60, for example, may be included within routers 53 and servers 54 of FIG. 1, or may be included within other embedded systems, such as within mobile stations or devices 30 and 32, wireline device 35, and so on. When the system 60 is comprised solely of an ACE 100, as discussed in greater detail below, that ACE 100 will generally be configured to include processing, interface and other I/O functionality, with memory configured either through memory computational elements or directly within the matrix interconnection network (MIN). The system 60, as illustrated in FIG. 2 with optional processing element 65, interface 62, and memory 61, will typically be implemented to provide retrocompatibility with existing or other legacy systems and devices.

The interface 62 is utilized for appropriate connection to a relevant channel, network or bus; for example, the interface 62 may provide impedance matching, drivers and other functions for a wireline interface, may provide demodulation and analog to digital conversion for a wireless interface, and may provide a physical interface for the memory 61 with other devices. In general, the interface 62 is used to receive and transmit data, depending upon the selected embodiment, such as voice information, configuration information, silverware modules, control messages, authentication data and other pertinent information. The ACE 100 may also be configured to provide the functionality of the interface 62, including internal IC I/O and external (off-chip) I/O, such as for PCI bus control. The memory 61 may be an integrated circuit or portion of an integrated circuit, such as various forms of RAM, DRAM, SRAM, MRAM, FeRAM, ROM, EPROM, $E^2$PROM, flash, and so on. For non-IC (or non-SOC) embodiments, the memory 61 may also be a magnetic (hard of floppy) drive, an optical storage device, or any other type of data storage apparatus and, as indicated above, may be distributed across multiple devices. In addition, depending upon the selected embodiment, and as discussed in greater detail below, the memory 61 may also be included within the ACE 100, through memory computational elements or within the matrix interconnection network (MIN). One or more processing elements 65 optionally may be included within system 60, such as a microprocessor or digital signal processor ("DSP"), to provide any additional processing capability, such as reduced instruction set ("RISC") processing, or may be included as computational elements within the ACE 100.

The operation of the various systems illustrated in FIGS. 1 and 2 is discussed in greater detail below, following explanation of the ACE 100 architecture with reference to FIGS. 3-9, and also with reference to FIG. 10.

Figure 3:
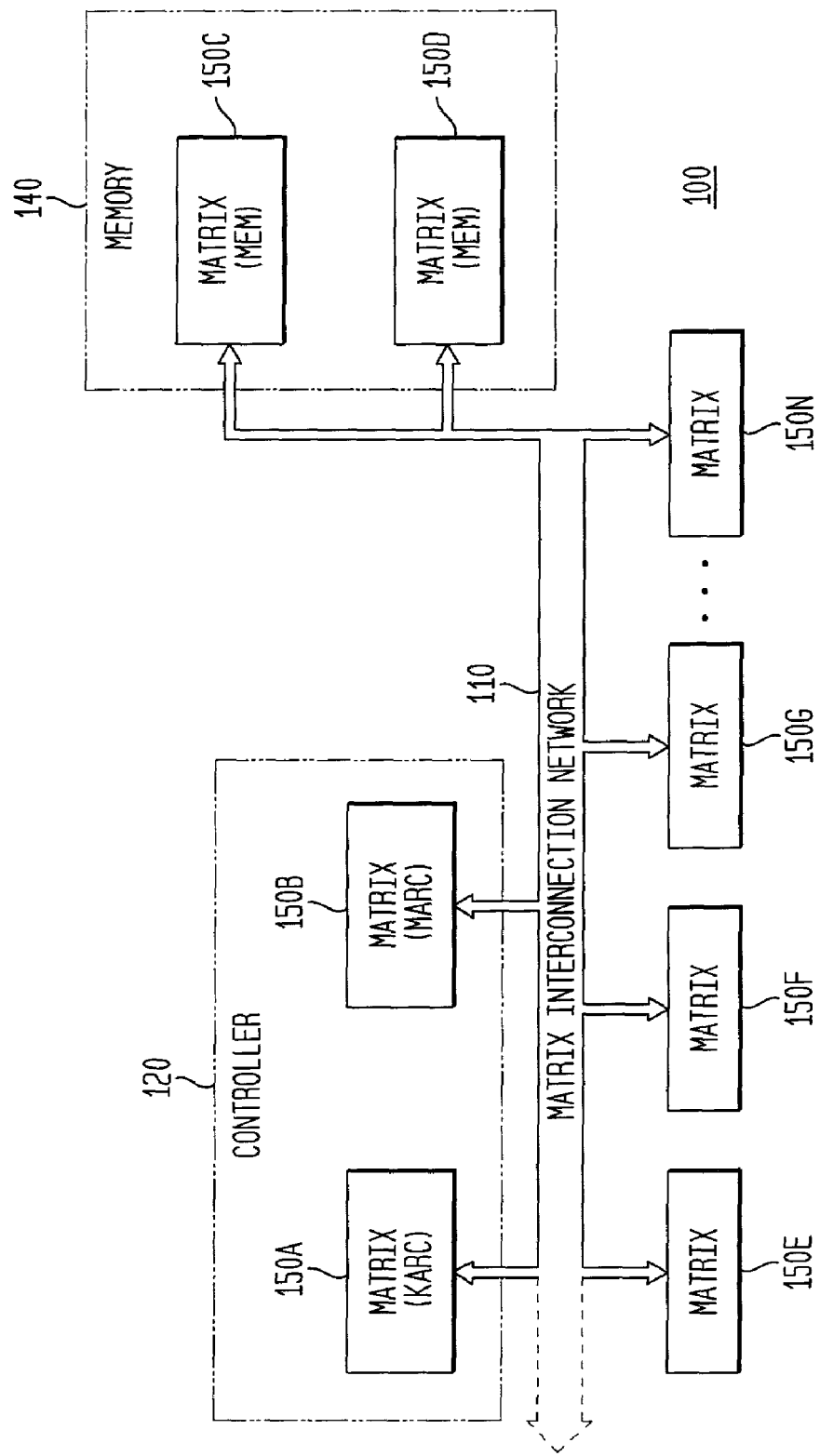
FIG. 3 is a block diagram illustrating a preferred adaptive computing engine (ACE) embodiment in accordance with the present invention.
Figure 4:
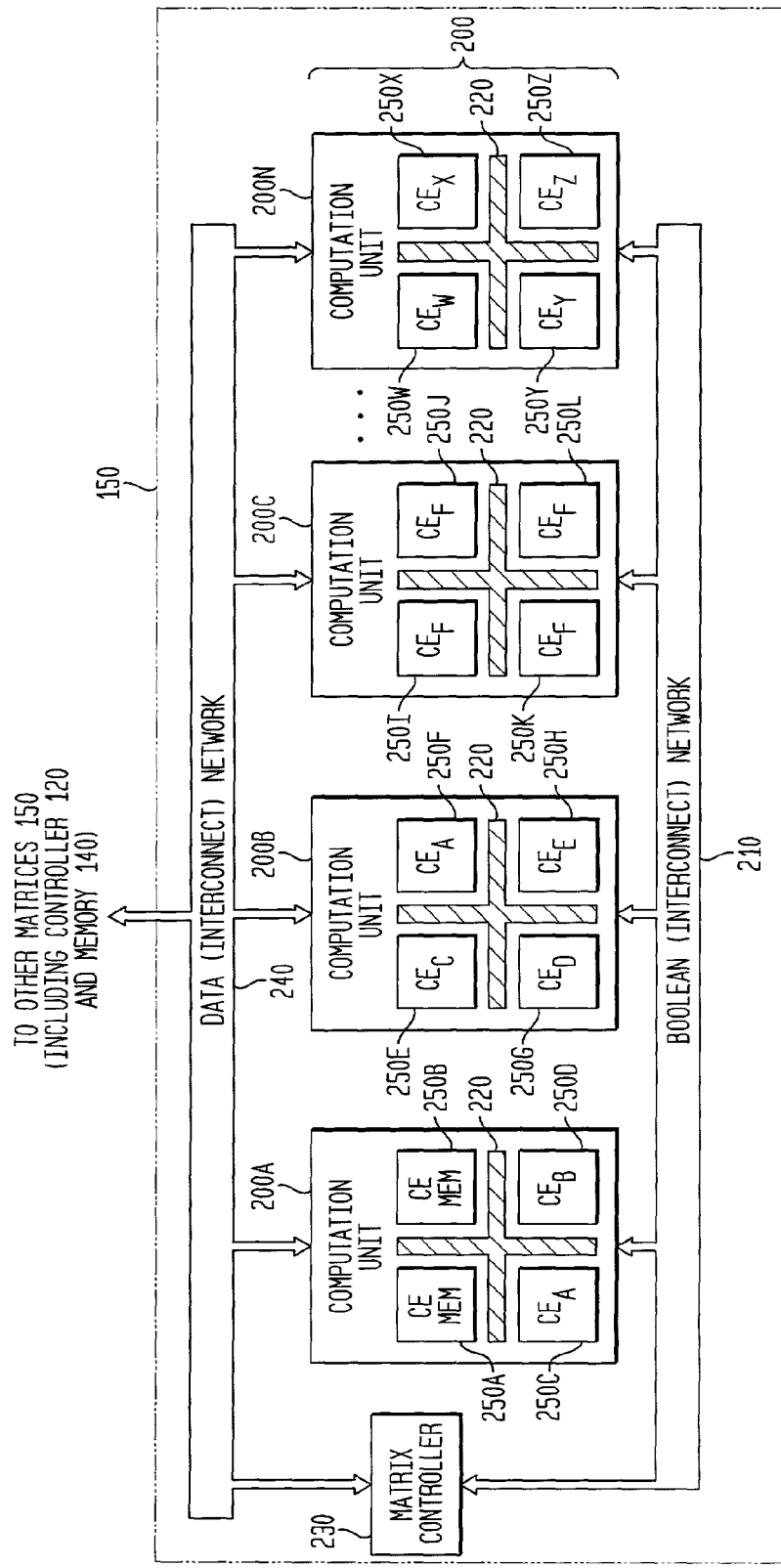
FIG. 4 is a block diagram illustrating a reconfigurable matrix, a plurality of computation units, and a plurality of computational elements, in accordance with the present invention.

FIG. 3 is a block diagram illustrating a preferred ACE apparatus 100 embodiment in accordance with the present invention. The ACE 100 is preferably embodied as an integrated circuit, or as a portion of an integrated circuit having other, additional components. (The ACE 100 is also described in detail in the related application.) In the preferred embodiment, and as discussed in greater detail below, the ACE 100 includes one or more reconfigurable matrices (or nodes) 150, such as matrices 150A through 150N as illustrated, and a matrix interconnection network (MIN) 110. Also in the preferred embodiment, and as discussed in detail below, one or more of the matrices 150, such as matrices 150A and 150B, are configured for functionality as a controller 120, while other matrices, such as matrices 150C and 150D, are configured for functionality as a memory 140. While illustrated as separate matrices 150A through 150D, it should be noted that these control and memory functionalities may be, and preferably are, distributed across a plurality of matrices 150 having additional functions to, for example, avoid any processing or memory "bottlenecks" or other limitations. Such distributed functionality, for example, is illustrated in FIG. 4. The various matrices 150 and matrix interconnection network 110 may also be implemented together as fractal subunits, which may be scaled from a few nodes to thousands of nodes.

A significant departure from the prior art, the ACE 100 does not utilize traditional (and typically separate) data, DMA, random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, to provide any given connection between and among the reconfigurable matrices 150, including those matrices 150 configured as the controller 120 and the memory 140, as discussed in greater detail below.

It should also be noted that once configured, the MIN 110 also and effectively functions as a memory, directly providing the interconnections for particular functions, until and unless it is reconfigured. In addition, such configuration and reconfiguration may occur in advance of the use of a particular function or operation, and/or may occur in real-time or at a slower rate, namely, in advance of, during or concurrently with the use of the particular function or operation. Such configuration and reconfiguration, moreover, may be occurring in a distributed fashion without disruption of function or operation, with computational elements in one location being configured while other computational elements (having been previously configured) are concurrently performing their designated function. This configuration flexibility of the ACE 100 contrasts starkly with FPGA reconfiguration, both which generally occurs comparatively slowly, not in real-time or concurrently with use, and which must be completed in its entirety prior to any operation or other use.

The matrices 150 configured to function as memory 140 may be implemented in any desired or preferred way, utilizing computational elements (discussed below) of fixed memory elements, and may be included within the ACE 100 or incorporated within another IC or portion of an IC (such as memory 61). In the preferred embodiment, the memory 140 is included within the ACE 100, and preferably is comprised of computational elements which are low power consumption random access memory (RAM), but also may be comprised of computational elements of any other form of memory, such as flash, DRAM, SRAM, MRAM, FeRAM, ROM, EPROM or $E^2$PROM. As mentioned, this memory functionality may also be distributed across multiple matrices 150, and may be temporally embedded, at any given time, as a particular MIN 110 configuration. In addition, in the preferred embodiment, the memory 140 preferably includes DMA engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor, such as a processing element 65 of FIG. 2.) This control functionality may also be distributed throughout one or more matrices 150 which perform other, additional functions as well. In addition, this control functionality may be included within and directly embodied as configuration information, without separate hardware controller functionality. The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the preferred form of combined data, configuration (and other control) information referred to herein interchangeably as "silverware" ("Agware") or as a "silverware" module.

Figure 5:
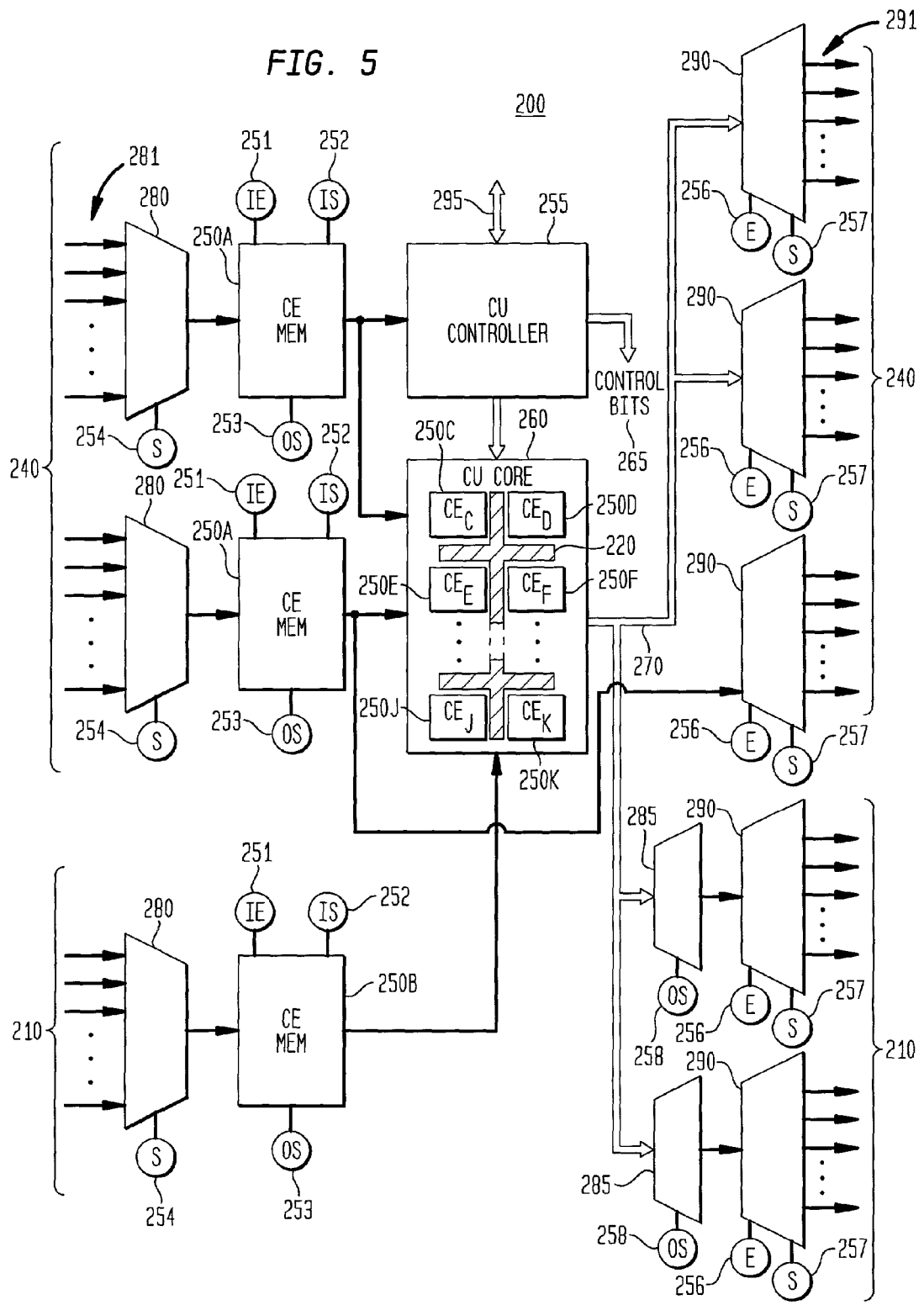
FIG. 5 is a block diagram illustrating, in greater detail, a computational unit of a reconfigurable matrix in accordance with the present invention.

The matrix interconnection network 110 of FIG. 3, and its subset interconnection networks separately illustrated in FIGS. 4 and 5 (Boolean interconnection network 210, data interconnection network 240, and interconnect 220), collectively and generally referred to herein as "interconnect", "interconnection(s)", "interconnection network(s)" or MIN, may be implemented generally as known in the art, such as utilizing field programmable gate array ("FPGA") interconnection networks or switching fabrics, albeit in a considerably more varied fashion. As used herein, "field programmability" refers to the capability for post-fabrication adding or changing of actual IC functionality, as opposed to programming of existing IC structure or function (such as in a microprocessor or DSP). In the preferred embodiment, the various interconnection networks are implemented as described, for example, in U.S. Pat. Nos. 5,218,240, 5,336,950, 5,245,227, and 5,144,166, and also as discussed below and as illustrated with reference to FIGS. 7, 8 and 9. These various interconnection networks provide selectable (or switchable) connections between and among the controller 120, the memory 140, the various matrices 150, and the computational units 200 and computational elements 250 discussed below, providing the physical basis for the configuration and reconfiguration referred to herein, in response to and under the control of configuration signaling generally referred to herein as "configuration information". In addition, the various interconnection networks (110, 210, 240 and 220) provide selectable, routable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses.

It should be pointed out, however, that while any given switching or selecting operation of or within the various interconnection networks (110, 210, 240 and 220) may be implemented as known in the art, the design and layout of the various interconnection networks (110, 210, 240 and 220), in accordance with the present invention, are new and novel, as discussed in greater detail below. For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired-configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 4 and 5, which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail below.

Several different, insightful and novel concepts are incorporated within the ACE 100 architecture of the present invention, and provide a useful explanatory basis for the real-time operation of the ACE 100 and its inherent advantages.

The first novel concept of the present invention concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 4) of the matrices 150, such as pluralities of multipliers, complex multipliers, and adders, each of which are designed for optimal execution of corresponding multiplication, complex multiplication, and addition functions. Given that the ACE 100 is to be optimized, in the preferred embodiment, for low power consumption, the functions for acceleration are selected based upon power consumption. For example, for a given application such as mobile communication, corresponding C (or C++) or other code may be analyzed for power consumption. Such empirical analysis may reveal, for example, that a small portion of such code, such as 10%, actually consumes 90% of the operating power when executed. In accordance with the present invention, on the basis of such power utilization, this small portion of code is selected for acceleration within certain types of the reconfigurable matrices 150, with the remaining code, for example, adapted to run within matrices 150 configured as controller 120. Additional code may also be selected for acceleration, resulting in an optimization of power consumption by the ACE 100, up to any potential trade-off resulting from design or operational complexity. In addition, as discussed with respect to FIG. 4, other functionality, such as control code, may be accelerated within matrices 150 when configured as finite state machines. Through the varying levels of interconnect, corresponding algorithms are then implemented, at any given time, through the configuration and reconfiguration of fixed computational elements (250), namely, implemented within hardware which has been optimized and configured for efficiency, i.e., a "machine" is configured in real-time which is optimized to perform the particular algorithm.

The next and perhaps most significant concept of the present invention, and a marked departure from the concepts and precepts of the prior art, is the concept of reconfigurable "heterogeneity" utilized to implement the various selected algorithms mentioned above. As indicated in the related application, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, in accordance with the present invention, within computation units 200, different computational elements (250) are implemented directly as correspondingly different fixed (or dedicated) application specific hardware, such as dedicated multipliers, complex multipliers, and adders. Utilizing interconnect (210 and 220), these differing, heterogeneous computational elements (250) may then be adaptively configured, in advance, in real-time or at a slower rate, to perform the selected algorithm, such as the performance of discrete cosine transformations often utilized in mobile communications. As a consequence, in accordance with the present invention, different ("heterogeneous") computational elements (250) are configured and reconfigured, at any given time, to optimally perform a given algorithm or other function. In addition, for repetitive functions, a given instantiation or configuration of computational elements may also remain in place over time, i.e., unchanged, throughout the course of such repetitive calculations.

The temporal nature of the ACE 100 architecture should also be noted. At any given instant of time, utilizing different levels of interconnect (110, 210, 240 and 220), a particular configuration may exist within the ACE 100 which has been optimized to perform a given function or implement a particular algorithm, such as to implement pilot signal searching for a CDMA operating mode in a mobile station 30 or 32. At another instant in time, the configuration may be changed, to interconnect other computational elements (250) or connect the same computational elements 250 differently, for the performance of another function or algorithm, such as multipath reception for a CDMA operating mode. Two important features arise from this temporal reconfigurability. First, as algorithms may change over time to, for example, implement a new technology standard, the ACE 100 may co-evolve and be reconfigured to implement the new algorithm. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors. This temporal reconfigurability also illustrates the memory functionality inherent in the MIN 110, as mentioned above.

This temporal reconfigurability of computational elements 250, for the performance of various different algorithms, also illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and reconfigurability, as used herein, includes the additional capability of adding or creating new functions which were previously unavailable or non-existent.

Next, the present invention also utilizes a tight coupling (or interdigitation) of data and configuration (or other control) information, within one, effectively continuous stream of information. This coupling or commingling of data and configuration information, referred to as "silverware" or as a "silverware" module, is the subject of another, second related patent application. For purposes of the present invention, however, it is sufficient to note that this coupling of data and configuration information into one information (or bit) stream, which may be continuous or divided into packets, helps to enable real-time reconfigurability of the ACE 100, without a need for the (often unused) multiple, overlaying networks of hardware interconnections of the prior art. For example, as an analogy, a particular, first configuration of computational elements 250 at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements 250 has occurred (i.e., is in place), as directed by (a first subset of) the configuration information, the data for use in the algorithm is immediately available as part of the silverware module. The same computational elements 250 may then be reconfigured for a second period of time, as directed by second configuration information (i.e., a second subset of configuration information), for execution of a second, different algorithm, also utilizing immediately available data. The immediacy of the data, for use in the configured computational elements 250, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or digital signal processor ("DSP").

This use of silverware modules, as a commingling of data and configuration information, in conjunction with the reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device. For example, in accordance with the present invention, while configured for a first operating mode, using a first set of configuration information, as a CDMA mobile telephone for use in the United States, the ACE 100 may be reconfigured using a second set of configuration information for an operating mode as a GSM mobile telephone for use in Europe.

Referring again to FIG. 3, the functions of the controller 120 (preferably matrix (KARC) 150A and matrix (MARC) 150B, configured as finite state machines) may be explained (1) with reference to a silverware module, namely, the tight coupling of data and configuration information within a single stream of information, (2) with reference to multiple potential modes of operation, (3) with reference to the reconfigurable matrices 150, and (4) with reference to the reconfigurable computation units 200 and the computational elements 250 illustrated in FIG. 4. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In the preferred embodiment, one of the plurality of matrices 150 is configured to decrypt such a module and verify its validity, for security purposes. Next, prior to any configuration or reconfiguration of existing ACE 100 resources, the controller 120, through the matrix (KARC) 150A, checks and verifies that the configuration or reconfiguration may occur without adversely affecting any pre-existing functionality, such as whether the addition of music functionality would adversely affect pre-existing mobile communications functionality. In the preferred embodiment, the system requirements for such configuration or reconfiguration are included within the silverware module or configuration information, for use by the matrix (KARC) 150A in performing this evaluative function. If the configuration or reconfiguration may occur without such adverse affects, the silverware module is allowed to load into the matrices 150 (of memory 140), with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 100.

Continuing to refer to FIG. 3, the matrix (MARC) 150B manages the scheduling of matrix 150 resources, clocking, and the timing of any corresponding data, to synchronize any configuration or reconfiguration of the various computational elements 250 and computation units 200 with any corresponding input data and output data. In the preferred embodiment, timing or other clocking information is also included within a silverware module or, more generally, within configuration information, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real-time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150.

FIG. 4 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250. As illustrated in FIG. 4, any matrix 150 generally includes a matrix controller 230, a plurality of computation (or computational) units 200, and as logical or conceptual subsets or portions of the matrix interconnect network 110, a data interconnect network 240 and a Boolean interconnect network 210. As mentioned above, in the preferred embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 4, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, utilizing the interconnect 220, the Boolean network 210, and the matrix interconnection network 110.

In the preferred embodiment, the various computational elements 250 are designed and grouped together, into the various adaptive and reconfigurable computation units 200 (as illustrated, for example, in FIGS. 5 through 9). In addition to computational elements 250 which are designed to execute a particular algorithm or function, such as multiplication, correlation, or addition, other types of computational elements 250 are also utilized in the preferred embodiment. As illustrated in FIG. 4, computational elements 250A and 250B implement memory, to provide local memory elements for any given calculation or processing function (compared to the more "remote" memory 140). In addition, computational elements 250I, 250J, 250K and 250L are configured to implement finite state machines (using, for example, the computational elements illustrated in FIGS. 7, 8 and 9), to provide local processing capability (compared to the more "remote" matrix (MARC) 150B), especially suitable for complicated control processing.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on (as illustrated below, for example, with reference to FIG. 6). A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 4 and as illustrated in greater detail below with respect to FIGS. 7 through 9), particularly useful for complicated control sequences, dynamic scheduling, and input/output management, while a fourth type may implement memory and memory management, such as computation unit 200A as illustrated in FIG. 4. Lastly, a fifth type of computation unit 200 may be included to perform bit-level manipulation, such as for encryption, decryption, channel coding, Viterbi decoding, and packet and protocol processing (such as Internet Protocol processing).

In the preferred embodiment, in addition to control from other matrices or nodes 150, a matrix controller 230 may also be included or distributed within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

FIG. 5 is a block diagram illustrating, in greater detail, an exemplary or representative computation unit 200 of a reconfigurable matrix 150 in accordance with the present invention. As illustrated in FIG. 5, a computation unit 200 typically includes a plurality of diverse, heterogeneous and fixed computational elements 250, such as a plurality of memory computational elements 250A and 250B, and forming a computational unit ("CU") core 260, a plurality of algorithmic or finite state machine computational elements 250C through 250K. As discussed above, each computational element 250, of the plurality of diverse computational elements 250, is a fixed or dedicated, application specific circuit, designed and having a corresponding logic gate layout to perform a specific function or algorithm, such as addition or multiplication. In addition, the various memory computational elements 250A and 250B may be implemented with various bit depths, such as RAM (having significant depth), or as a register, having a depth of 1 or 2 bits.

Forming the conceptual data and Boolean interconnect networks 240 and 210, respectively, the exemplary computation unit 200 also includes a plurality of input multiplexers 280, a plurality of input lines (or wires) 281, and for the output of the CU core 260 (illustrated as line or wire 270), a plurality of output demultiplexers 285 and 290, and a plurality of output lines (or wires) 291. Through the input multiplexers 280, an appropriate input line 281 may be selected for input use in data transformation and in the configuration and interconnection processes, and through the output demultiplexers 285 and 290, an output or multiple outputs may be placed on a selected output line 291, also for use in additional data transformation and in the configuration and interconnection processes.

In the preferred embodiment, the selection of various input and output lines 281 and 291, and the creation of various connections through the interconnect (210, 220 and 240), is under control of control bits 265 from a computational unit controller 255, as discussed below. Based upon these control bits 265, any of the various input enables 251, input selects 252, output selects 253, MUX selects 254, DEMUX enables 256, DEMUX selects 257, and DEMUX output selects 258, may be activated or deactivated.

The exemplary computation unit 200 includes the computation unit controller 255 which provides control, through control bits 265, over what each computational element 250, interconnect (210, 220 and 240), and other elements (above) does with every clock cycle. Not separately illustrated, through the interconnect (210, 220 and 240), the various control bits 265 are distributed, as may be needed, to the various portions of the computation unit 200, such as the various input enables 251, input selects 252, output selects 253, MUX selects 254, DEMUX enables 256, DEMUX selects 257, and DEMUX output selects 258. The CU controller 255 also includes one or more lines 295 for reception of control (or configuration) information and transmission of status information.

As mentioned above, the interconnect may include a conceptual division into a data interconnect network 240 and a Boolean interconnect network 210, of varying bit widths, as mentioned above. In general, the (wider) data interconnection network 240 is utilized for creating configurable and reconfigurable connections, for corresponding routing of data and configuration information. The (narrower) Boolean interconnect network 210, while also utilized for creating configurable and reconfigurable connections, is utilized for control of logic (or Boolean) decisions of data flow graphs (DFGs), generating decision nodes in such DFGs, and may also be used for data routing within such DFGs.

Figure 6:
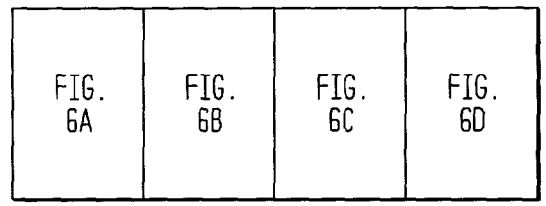
FIG. 6 is a block diagram illustrating, in detail, a preferred multi-function adaptive computational unit having a plurality of different, fixed computational elements, in accordance with the present invention.
Figure 6A:
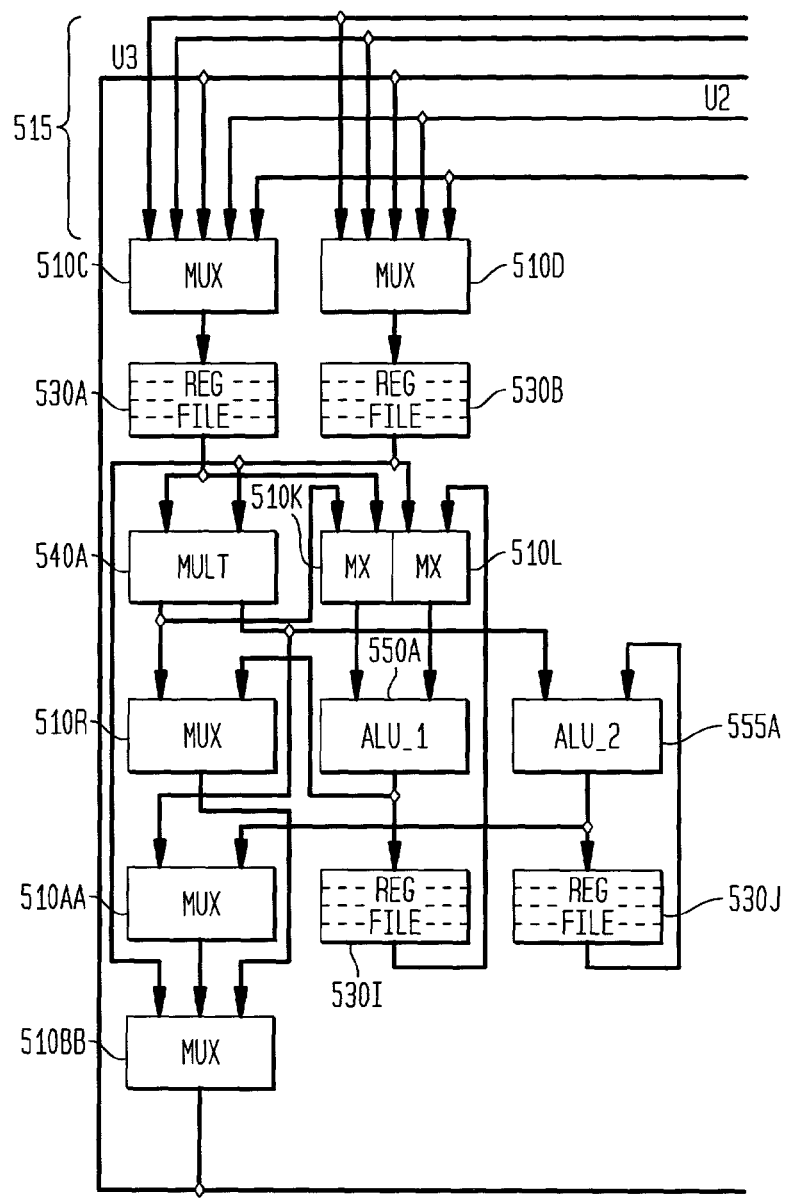
Figure 6B:
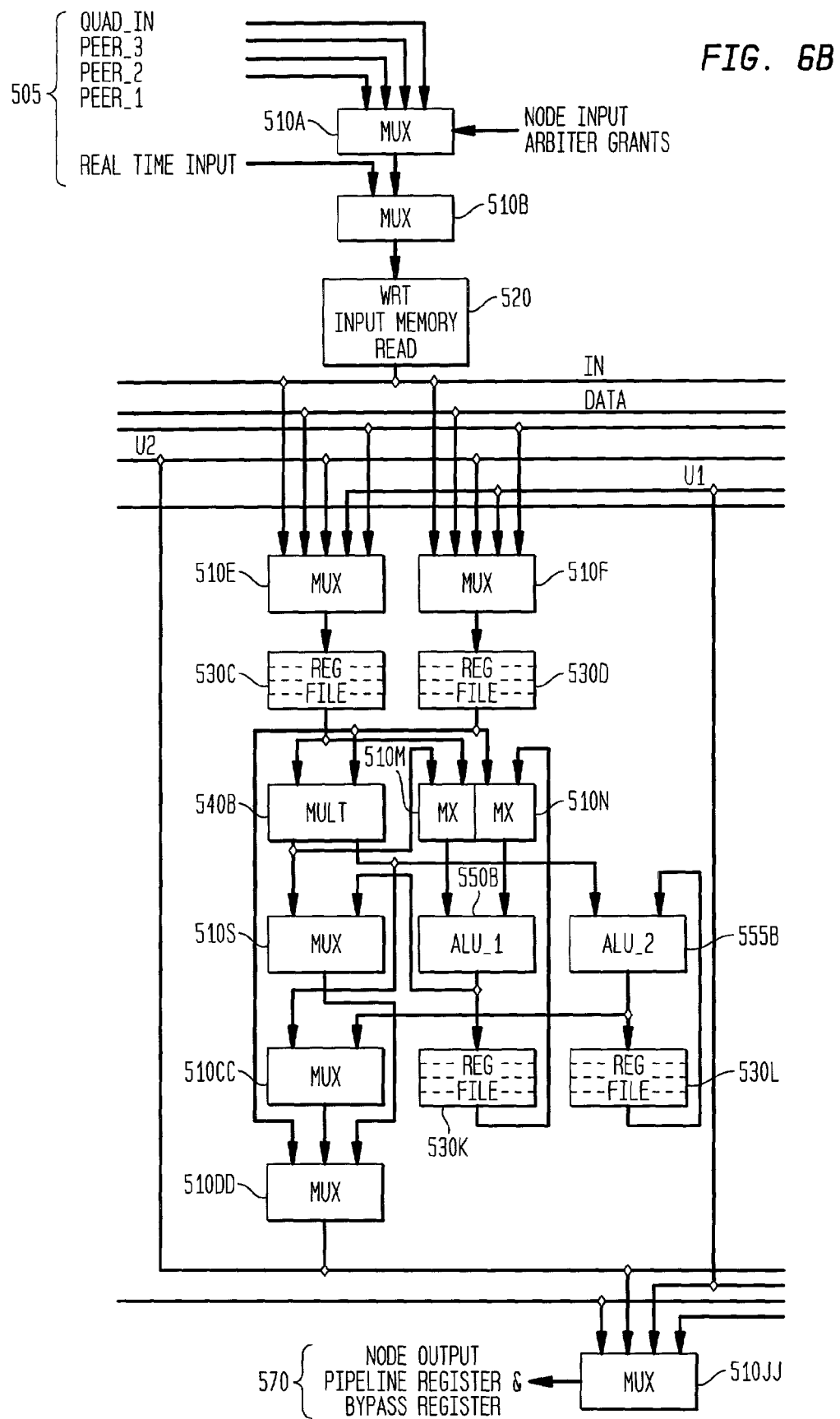
Figure 6C:
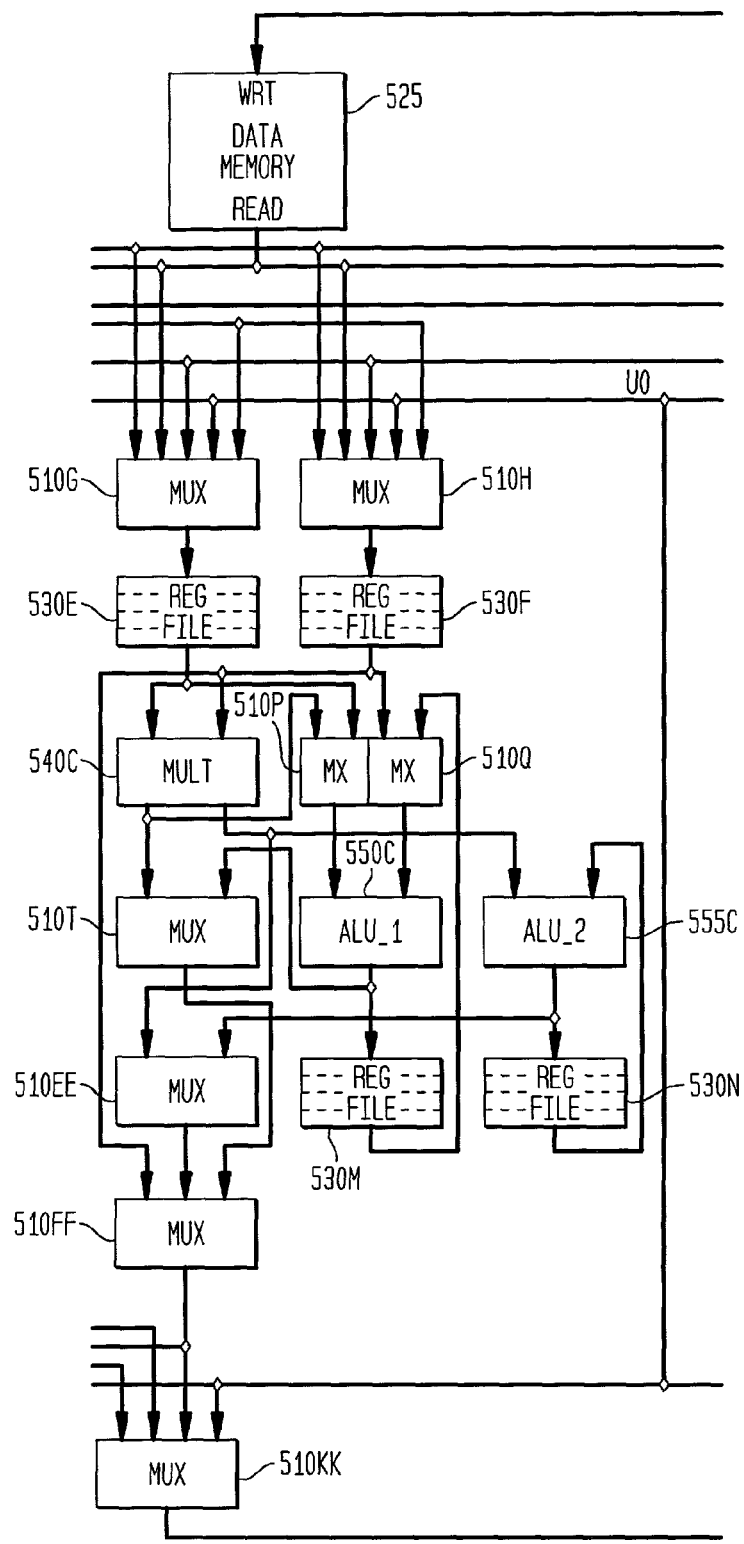
Figure 6D:
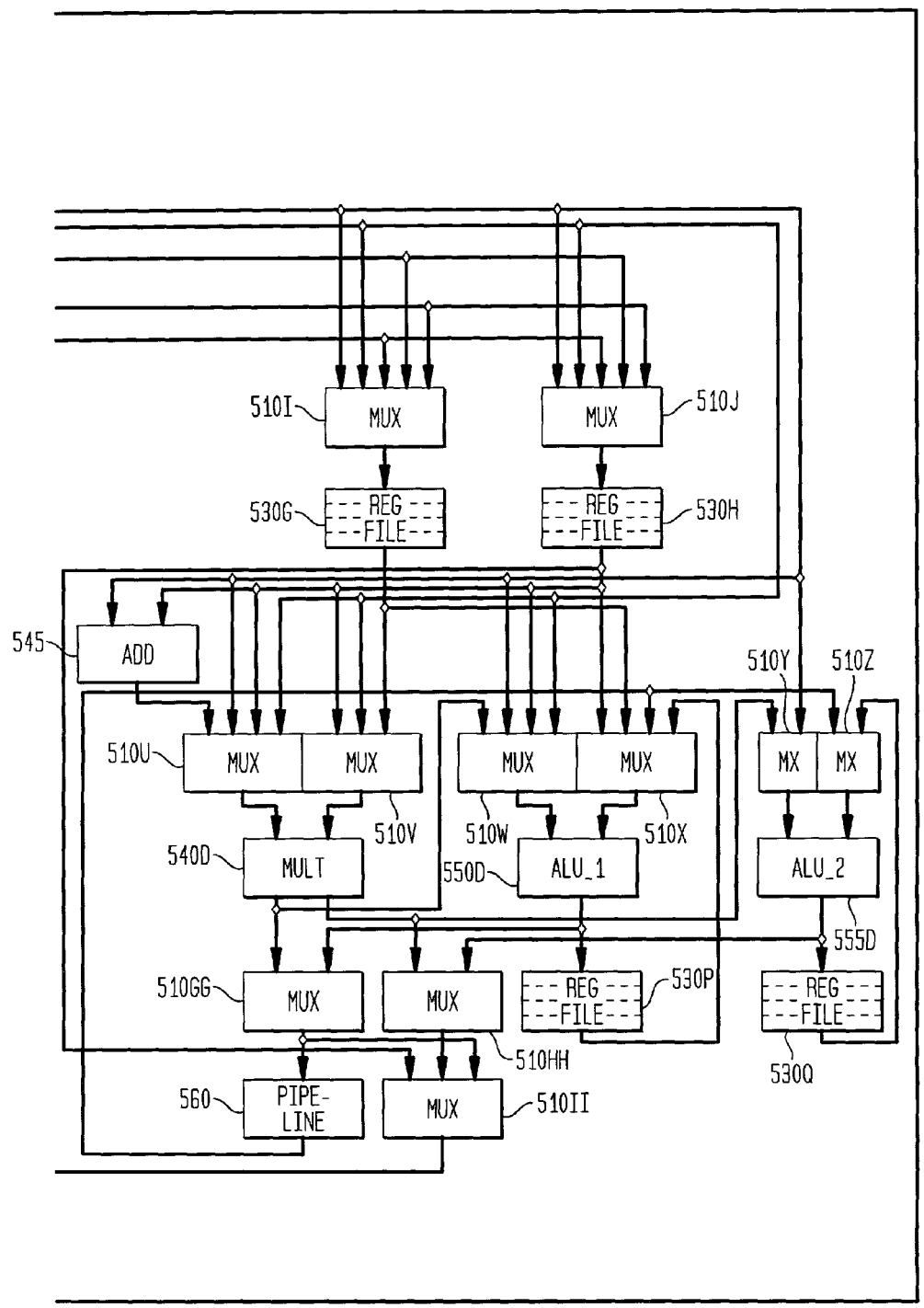

FIG. 6 is a block diagram illustrating, in detail, an exemplary, preferred multi-function adaptive computational unit 500 having a plurality of different, fixed computational elements 250, in accordance with the present invention. When configured accordingly, the adaptive computation unit 500 performs a wide variety of functions discussed in the related application, such as finite impulse response filtering, fast Fourier transformation, and other functions such as discrete cosine transformation, useful for communication operating modes. As illustrated, this multi-function adaptive computational unit 500 includes capability for a plurality of configurations of a plurality of fixed computational elements, including input memory 520, data memory 525, registers 530 (illustrated as registers 530A through 530Q), multipliers 540 (illustrated as multipliers 540A through 540D), adder 545, first arithmetic logic unit (ALU) 550 (illustrated as ALU_1s 550A through 550D), second arithmetic logic unit (ALU) 555 (illustrated as ALU_2s 555A through 555D), and pipeline (length 1) register 560, with inputs 505, lines 515, outputs 570, and multiplexers (MUXes or MXes) 510 (illustrates as MUXes and MXes 510A through 510KK) forming an interconnection network (210, 220 and 240). The two different ALUs 550 and 555 are preferably utilized, for example, for parallel addition and subtraction operations, particularly useful for radix 2 operations in discrete cosine transformation.

Figure 7:
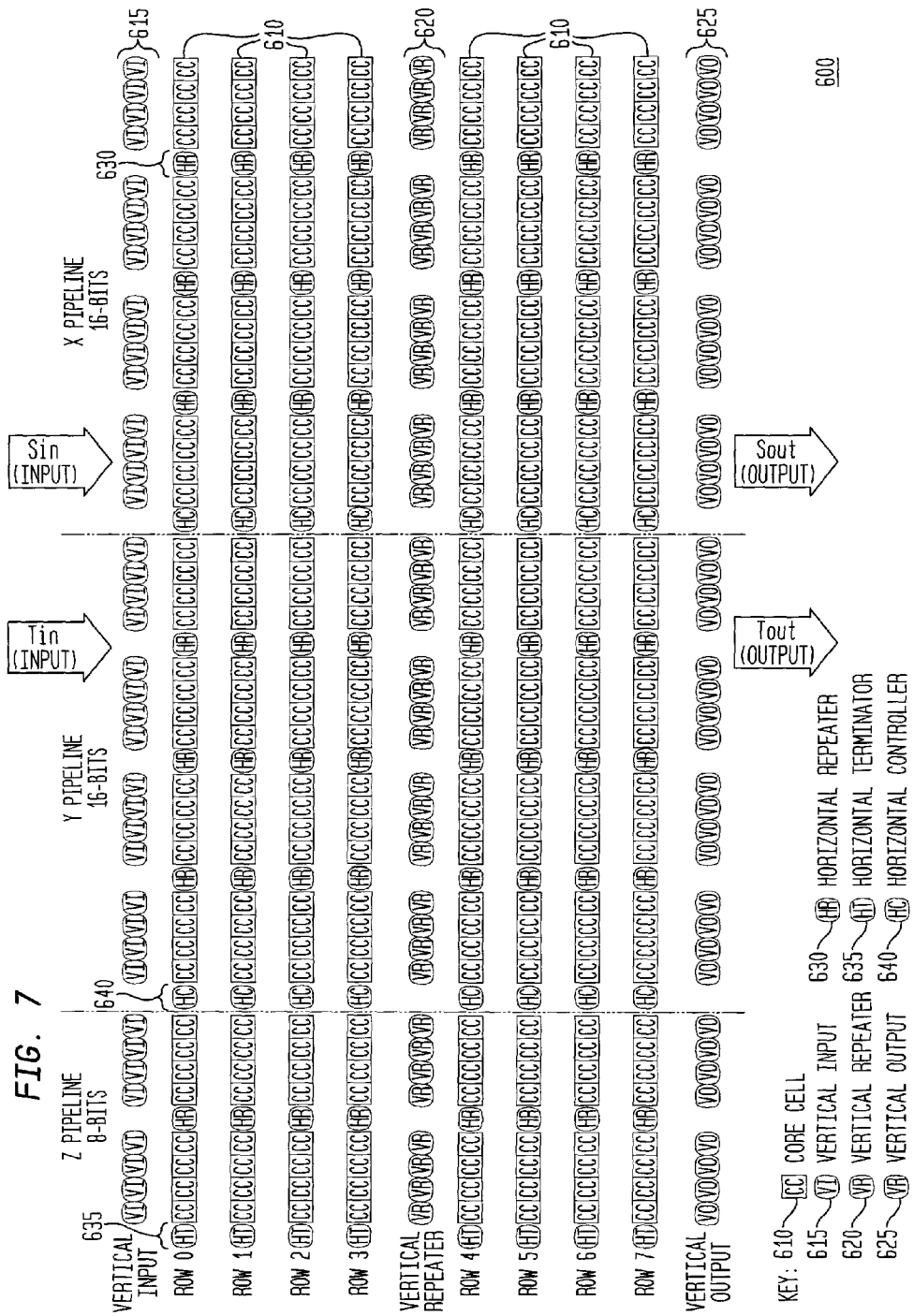
FIG. 7 is a block diagram illustrating, in detail, a preferred adaptive logic processor computational unit having a plurality of fixed computational elements, in accordance with the present invention.

FIG. 7 is a block diagram illustrating, in detail, a preferred adaptive logic processor (ALP) computational unit 600 having a plurality of fixed computational elements, in accordance with the present invention. The ALP 600 is highly adaptable, and is preferably utilized for input/output configuration, finite state machine implementation, general field programmability, and bit manipulation. The fixed computational element of ALP 600 is a portion (650) of each of the plurality of adaptive core cells (CCs) 610 (FIG. 8), as separately illustrated in FIG. 9. An interconnection network (210, 220 and 240) is formed from various combinations and permutations of the pluralities of vertical inputs (VIs) 615, vertical repeaters (VRs) 620, vertical outputs (VOs) 625, horizontal repeaters (HRs) 630, horizontal terminators (HTs) 635, and horizontal controllers (HCs) 640.

Figure 8:
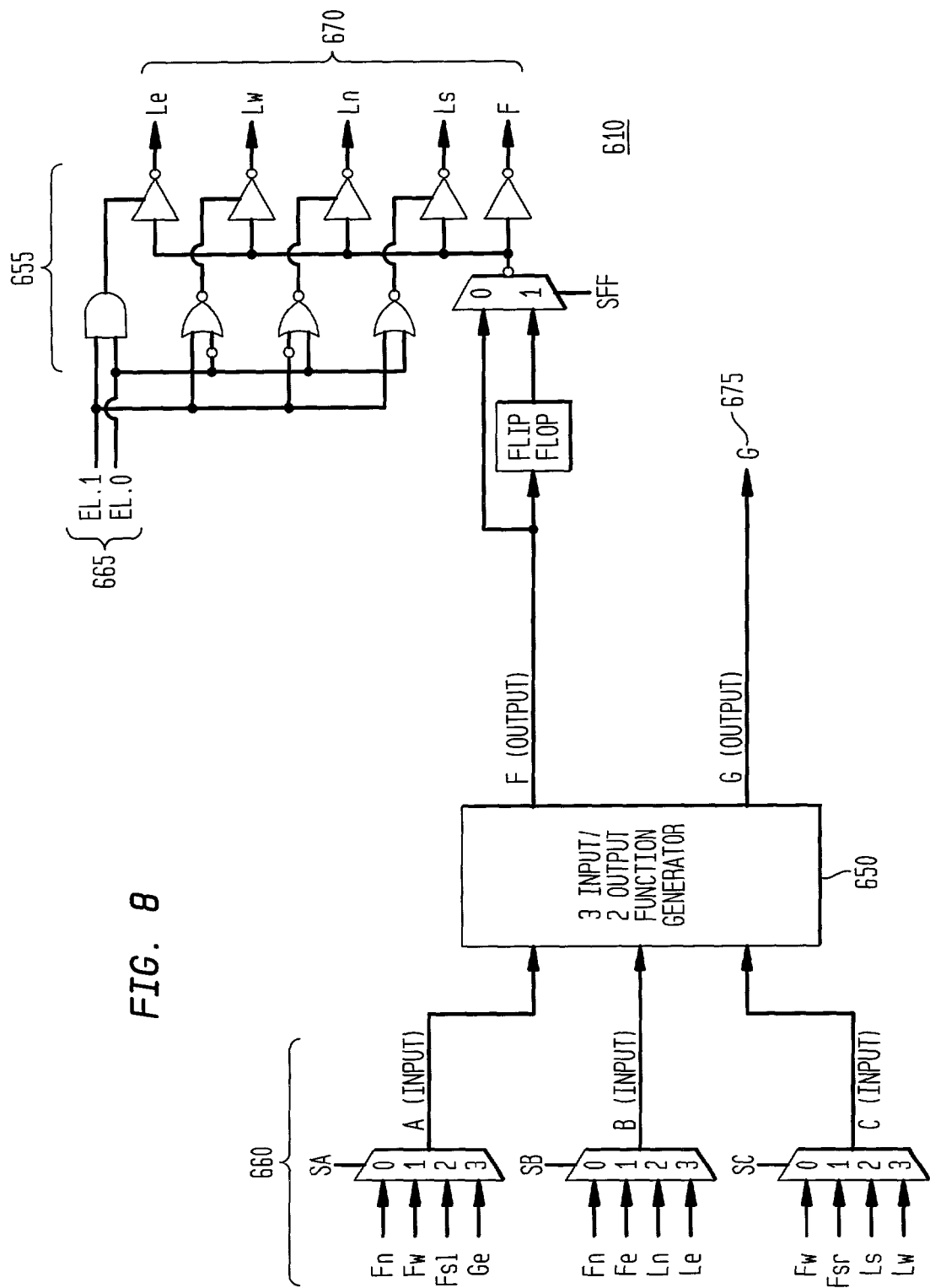
FIG. 8 is a block diagram illustrating, in greater detail, a preferred core cell of an adaptive logic processor computational unit with a fixed computational element, in accordance with the present invention.

FIG. 8 is a block diagram illustrating, in greater detail, a preferred core cell 610 of an adaptive logic processor computational unit 600 with a fixed computational element 650, in accordance with the present invention. The fixed computational element is a 3-input-2-output function generator 550, separately illustrated in FIG. 9. The preferred core cell 610 also includes control logic 655, control inputs 665, control outputs 670 (providing output interconnect), output 675, and inputs (with interconnect muxes) 660 (providing input interconnect).

Figure 9:
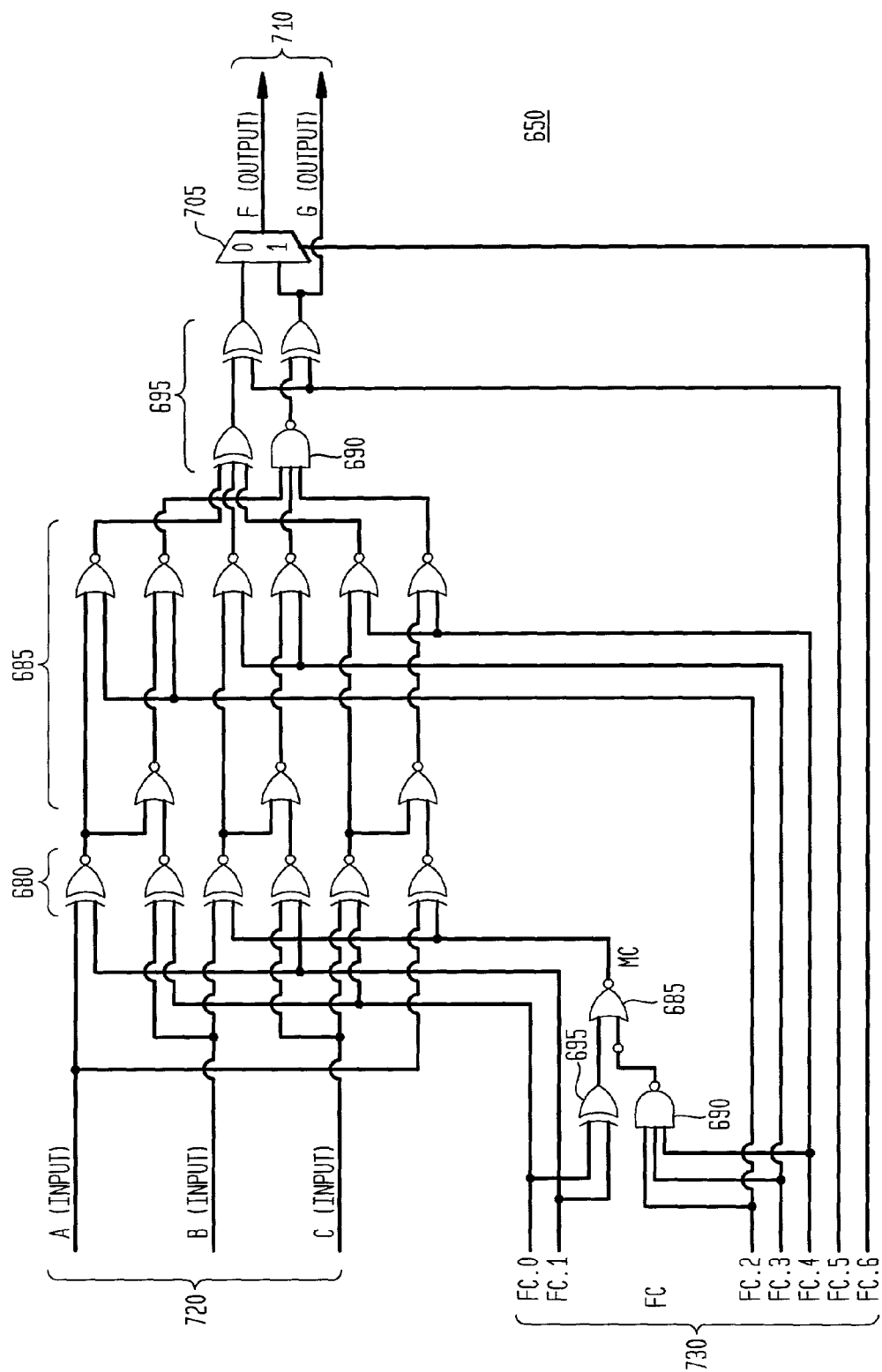
FIG. 9 is a block diagram illustrating, in greater detail, a preferred fixed computational element of a core cell of an adaptive logic processor computational unit, in accordance with the present invention.

FIG. 9 is a block diagram illustrating, in greater detail, a preferred fixed computational element 650 of a core cell 610 of an adaptive logic processor computational unit 600, in accordance with the present invention. The fixed computational element 650 is comprised of a fixed layout of pluralities of exclusive NOR (XNOR) gates 680, NOR gates 685, NAND gates 690, and exclusive OR (XOR) gates 695, with three inputs 720 and two outputs 710. Configuration and interconnection is provided through MUX 705 and interconnect inputs 730.

As may be apparent from the discussion above, this use of a plurality of fixed, heterogeneous computational elements (250), which may be configured and reconfigured to form heterogeneous computation units (200), which further may be configured and reconfigured to form heterogeneous matrices 150, through the varying levels of interconnect (110, 210, 240 and 220), creates an entirely new class or category of integrated circuit, which may be referred to interchangeably as an adaptive computing architecture or adaptive computing engine. It should be noted that the adaptive computing architecture of the present invention cannot be adequately characterized, from a conceptual or from a nomenclature point of view, within the rubric or categories of FPGAs, ASICs or processors. For example, the non-FPGA character of the adaptive computing architecture is immediately apparent because the adaptive computing architecture does not comprise either an array of identical logical units, or more simply, a repeating array of any kind. Also for example, the non-ASIC character of the adaptive computing architecture is immediately apparent because the adaptive computing architecture is not application specific, but provides multiple modes of functionality and is reconfigurable, preferably in real-time. Continuing with the example, the non-processor character of the adaptive computing architecture is immediately apparent because the adaptive computing architecture becomes configured, to directly operate upon data, rather than focusing upon executing instructions with data manipulation occurring as a byproduct.

Referring again to FIGS. 1 and 2, the various systems and methodology of the present invention may now be viewed in context of the ACE 100 architecture, based upon configuration and/or reconfiguration of fixed computational elements 250 in response to one or more sets of configuration information. Without the "something more" of configuration information, an ACE 100 is essentially or effectively an empty or "blank" device. Configuration information is necessary to generate the configurations creating one or more operating modes for the ACE 100, in order to provide a desired functionality and operate upon corresponding data, such as wireless communication, radio reception, or MP3 music playing.

Such configuration and reconfiguration may occur in a wide variety of ways. For example, an entire ACE 100 may be configured in advance of any particular use, such as preconfigured as a mobile communication device. In other embodiments, an ACE 100 may be configured to have an operating system, to power on (boot), and obtain and load other configurations for particular operating modes and functions, such as through a network 40. An ACE 100 may also be partially configured, with some matrices 150 configured and operating, while other matrices 150 are being configured for other functions.

As mentioned above, such configuration information may be interleaved with data to form silverware (or a silverware module). In addition, such configuration information may also be separate from any data (effectively distributing a silverware module across time). For example, a first set of configuration information may be provided to an ACE 100 for a first operating mode, such as for mobile communications. Data may be subsequently provided separately, such as voice data, during any given communication session. The various controller 120 functions of the ACE 100 then interleave the appropriate subsets of configuration information with corresponding data to provide silverware modules to the matrices 150. As mentioned above, such controller functions may be distributed within the various matrices 150, or may be embedded within the configuration information itself.

Referring to FIG. 1, an ACE 100 may obtain configuration information from a plurality of sources. As illustrated in FIG. 1, configuration information may be provided to an ACE 100 through a download, from a server 54, WAN 42, LAN 41, or adjunct network entity 50, via a network 40 (with any applicable intervening switches 56 and 52 and base stations 25) or via a router 53, for example. The download may be either wireline (e.g. twisted pair, optical fiber, coaxial cable, hybrid fiber-coax) or wireless, such as through a transceiver of a base station 25 or satellite (not illustrated) or wireless LAN 43. The configuration information may also be provided to an ACE 100 through other media, such as a flash memory 10, a silverware storage medium 15, a computer or other machine-readable medium 20, PCMCIA cards, PDA modules, or other memory cards, for example. This configuration information, in the preferred ACE 100 embodiment, is stored in memory 140, distributed memory within the various matrices 150, or in the system 60 (SOC) embodiment, may also be stored in memory 61. Configuration information may also simply be stored as an actual configuration of the matrices 150, with the MIN 110 effectively functioning as memory. The configuration information may also be transient, distributed and received in real-time for a particular application or for a singular use. Other equivalent provisioning and storage means will be apparent to those of skill in the art. (An ACE 100 receiving configuration information, through a download or other medium, is generally referred to herein as a "receiving" ACE.)

In addition, a need or request for such configuration information may also arise from a plurality of sources, including a system user, an element of infrastructure, an ACE 100, another device including an ACE 100, or an independent device. For example, a system user may request a download of new configuration information to upgrade a device to a new standard, or may purchase a memory module (such as flash 10 or silverware storage medium 15) containing new configuration information for playing additional, copyrighted MP3 music. Infrastructure elements may also initiate downloads of new configurations, either transmitted to an individual ACE 100 device (a single user, with a one-to-one (1:1) correspondence of provider and receiver) or broadcast to many ACE 100 devices (multiple users, with a one-to-many (1:many) correspondence of provider and receivers), to provide system upgrades, to adapt to new standards, or to provide other, real-time performance enhancements.

Another novel element of the present invention concerns a configuration or reconfiguration request generated by an ACE 100 itself (or another device including an ACE 100) providing, among other things, mechanisms for self-modification and self-configuration. For example, an ACE 100 (in a mobile station 30 or 32) typically having a first, CDMA configuration for use in the United States may be powered on in Europe; in the absence of standard CDMA signaling, the ACE 100 may request a wireless download of a second set of configuration information applicable to its current location, enabling the ACE 100 to have a GSM configuration for use in Europe.

As indicated above, configuration information is generally plural, consisting of a plurality of subsets of configuration information, such as first configuration information, second configuration information, through $n^{th}$ configuration information. One "set" of configuration information may be considered to correspond to a particular operating mode of the ACE 100. For example, a first set of configuration information may provide a CDMA operating mode, while a second set of configuration information may provide a GSM operating mode.

Also as indicated above, for a given or selected higher-order operating mode of an ACE 100 (or, equivalently, for a given or selected set of configuration information), the various fixed, heterogeneous computational elements 250 are correspondingly configured and reconfigured for various lower-level or lower-order functional modes in response to the subsets of the configuration information, such as configuration for discrete cosine transformation in response to first configuration information and reconfiguration for fast Fourier transformation in response to second configuration information.

The configuration information may also have different forms. In one embodiment, configuration information may include one or more discrete packets of binary information, which may be stored in memory 140, distributively stored within the matrices 150, or directly stored as a configuration of MIN 110. Configuration information may also be embodied in a continuous form, such as a continuous stream of binary or other information. As directed, configuration and other control bits from the configuration information are interdigitated with data to form silverware modules, for use in real-time within an ACE 100. In another embodiment, configuration information may be provided in real-time with corresponding data, in the form of a continuous stream (continuous for the duration of the selected function). For example, configuration information for a MP3 player may be provided in real-time in a silverware stream with the data bit file for the music to be played.

Two additional features are utilized in the present invention to provide this capability for an ACE 100 to be safely and effectively configured and/or reconfigured in response to configuration information. First, a concept of "unit hardware", a parameter for or measurement of ACE 100 resources or capability, is utilized to gauge the capacity for a given ACE 100 to take on a new configuration and perform the new functionality, either in light of maintaining current configurations and functions and providing performance at sufficient or adequate levels, or in light of replacing current configurations and functions altogether. For example, a first generation ACE 100 may have sufficient resources, measured as unit hardware, to configure as a CDMA mobile station and simultaneously as a personal digital assistant. An attempt to load a new configuration, for example, for an MP3 player, may be inadvisable due to insufficient system resources, such that the new configuration would cause CDMA performance to degrade below acceptable levels. Conversely, a first generation ACE 100 initially configured as a PDA may have sufficient remaining resources to load the new configuration, as greater performance degradation may be allowable for these applications. Continuing with the example, a second or third generation ACE 100 may have sufficient computational element, interconnect and other ACE 100 resources to support not only its currently existing configurations, but also such new configurations (with corresponding additional functionality), such as maintaining existing CDMA configurations while simultaneously having sufficient resources for additional GSM and MP3 configurations.

Related to this concept of unit hardware to measure reconfiguration capacity is the concept of multiple versions or libraries of configuration information for the addition of new functionalities. Such multiple versions or libraries of configuration information are tailored to correspond to potentially differing capabilities of ACE 100 devices, particularly for application to the then current ACE architectures compared to legacy architectures. For example, a suite of different sets of configuration information may be developed to provide a particular operating mode, with differences pertaining to matters such as performance quality and the number and types of features. Each of the various sets or versions of the configuration information are generated to have system requirements corresponding to the available and varying levels of ACE 100 reconfiguration capacity. Such libraries of configuration information, having requirements levels corresponding to levels of "unit hardware", may be generated in advance of a requested download or other provision, or may be generated as needed, on a real-time basis, tailored to the particular configuration capacity of the receiving ACE 100. For example, corresponding, tailored configuration information downloads may be determined in real-time, based upon a negotiation or interactivity between the ACE 100 and the configuration provider, generating and providing configuration information suitable for a negotiated or predetermined level of performance for a given operating mode.

Also for example, configuration information for a particular operating mode may be available only with one version having predetermined system requirements. In that event, if the particular ACE 100 does not have the corresponding capacity to meet those requirements, the ACE 100 itself may reject or decline such a potential download.

As a consequence, prior to a configuration (and/or reconfiguration) of a particular ACE architecture for a particular operating mode, the capabilities of that ACE 100 are determined, to avoid a download or reception of a configuration which potentially may alter or harm pre-existing operating modes or other functionalities of the device, or to provide a more suitable download tailored for the capabilities of the particular ACE 100.

The nature of the malleable ACE 100 architecture, with different physical connections created or removed in response to configuration information, renders security for configuration and reconfiguration of paramount importance. Given that such configurations are capable of altering the operating mode of the ACE architecture, in the preferred method, system and apparatus embodiments, authorization and security measures are implemented to avoid potentially destructive or harmful configurations, such as due to viruses or other unwanted, rogue configuration information.

Several levels of security may be implemented to control the configurability and reconfigurability of an ACE 100. A first level of security is implemented at a level of authorization to request or receive configuration information. For example, an ACE 100 may have a unique identifier or digital signature transmitted to a server 54 during a "handshake" or other initial exchange of information (such as unit hardware information) prior to a download of configuration information. The server 54 may access a database of authorized recipients, and if the particular ACE 100 is included, the server 54 will authorize the download. Such authorization measures are important for the protection of intellectual property, such as copyrighted material, and other information which may be confidential or otherwise restricted. Another level of security may be implemented to protect against the possible download of rogue, virus or corrupted configuration information, utilizing various encryption and decryption technologies, for example.

Various forms of monitoring, tracking and other record keeping are also utilized for determining and accounting for the various configuration and content usage possibilities, and may involve numerous different network entities. For example, a particular download of configuration information may be generated from more than one network entity, with one transaction for a particular download of configuration information also distributed across more than one network entity. Continuing with the example, a request for a download of configuration information (or silverware) may be received at a base station 25 of a wireless service provider "A". To fulfill the request, the wireless service provider "A" determines the authorization status of the requesting ACE 100 and when authorized, forwards the request to another provider, such as content provider "B", which provides requested data, such as a music bit file, using a content server 54. Also in response to the request from provider "A", a set of MP3 configuration information is simultaneously provided by configuration provider "C", using a second, different server 54 under its control, such as a configuration information server. The content (data) and configuration information are provided to silverware provider "D", who in turn interleaves the data and configuration to form a silverware module, using a first adjunct network entity 50 having a silverware module application node 51. Next, an encryption provider "E" encrypts the silverware module, using a second adjunct network entity 50 having an encryption application node 51, providing the encrypted silverware module to the service provider "A" for transmission to the requesting ACE 100. Corresponding accounting and other records may be generated for each such distributed transaction, with corresponding distributions of royalties, use and license fees. Content usage may also be tracked by, for example, a content server.

The generation and provision of configuration information may also be distributed across time, in addition to distributed across space, with the various functions referred to above (and also discussed below with reference to FIG. 10) performed during different intervals of time. For example, one or more versions or sets of configuration information may be generated and stored during a first predetermined period of time, such as in advance of any particular use. Subsequently, such a set of configuration information may be provided during a second predetermined period of time, such as following a security and financial authorization process.

Figure 10:
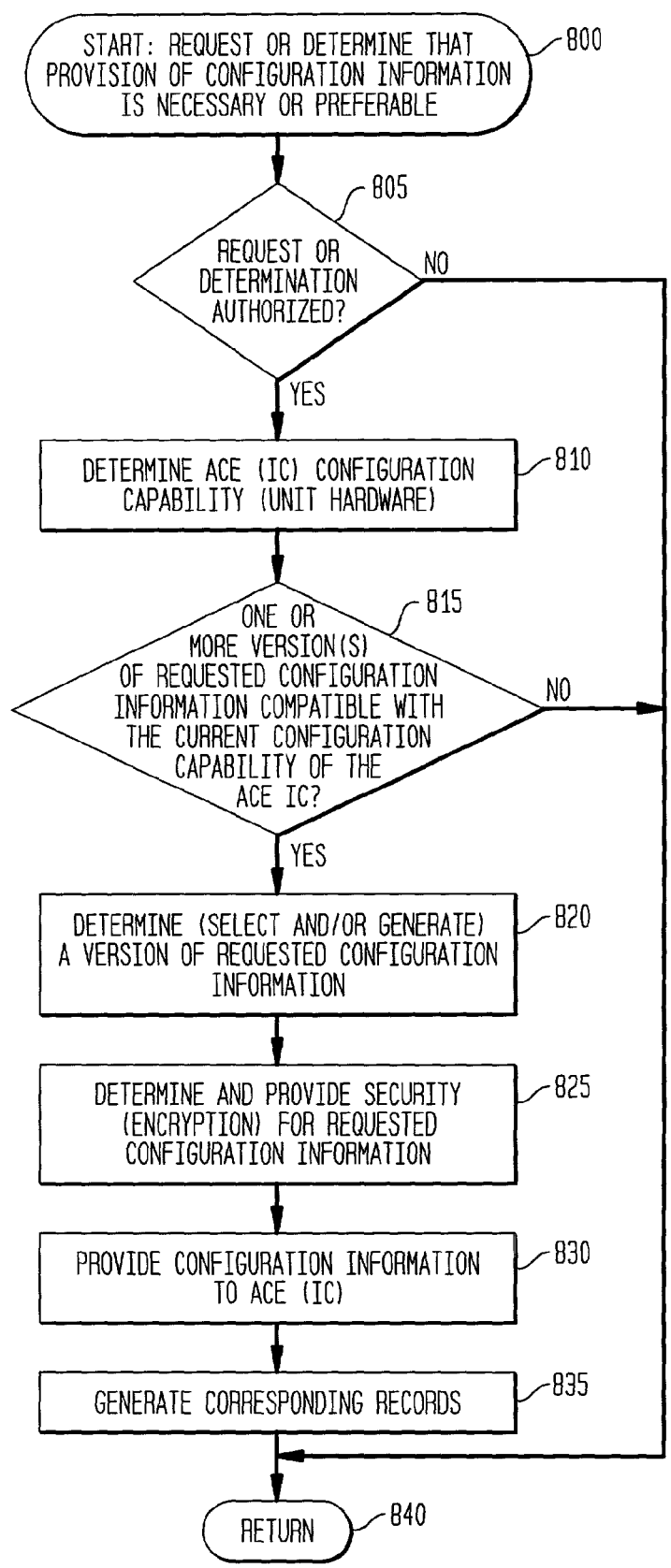
FIG. 10 is a flow diagram illustrating a method embodiment in accordance with the present invention.

FIG. 10 is a flow diagram illustrating a method embodiment in accordance with the present invention, and provides a useful summary. The method illustrated in FIG. 10 concerns provision of configuration information through a network 40 of some kind. Many of the steps described below may be omitted for other forms of delivery, such as the provision of configuration information through the purchase of a flash module 10.

The method begins, start step 800, with a request or determination that reception of a set of configuration information is necessary or advisable. As mentioned above, such a request or determination may be generated by an ACE 100, by a network entity, such as a server 54 or adjunct network entity 50, or by another device. The method then determines, in step 805, whether such a request (or determination) is authorized. When unauthorized, the method may end, return step 840.

When authorized in step 805, the method determines the reconfiguration capabilities of the ACE 100, i.e., determines the available unit hardware of the receiving ACE 100, step 810. Next, a determination is made as to whether one or more versions of the configuration information are available which are suitable for the determined reconfiguration capabilities of the ACE 100, step 815. If no suitable version is available in step 815, the method also may end, return step 840. When a suitable version is available in step 815, a version is selected (and generated) which is suitable for the receiving ACE 100, step 820. As indicated above, step 820 may be an interactive or negotiated process, based upon available reconfiguration capabilities and priorities among operating modes potentially competing for the same resources. In addition, also as mentioned above, the generation and storage of the selected version of the requested configuration information may occur in advance, or may occur at run time (download time).

Following selection of appropriate configuration information, security measures are implemented, such as encryption of a configuration bit file, step 825. The secure configuration information is then transferred to the receiving ACE 100, step 830, such as through a network download or the provision of a medium containing a corresponding bit file (e.g., flash 10 or media 15 and 20). In the preferred embodiment, corresponding records are also generated, step 835, such as updating a database to reflect a new configuration information version, and generating accounting or billing entries. Following step 835, or following steps 805 and 815, the method may end, return step 840.

Numerous advantages of the various embodiments of the present invention are readily apparent. The present invention provides a method and system for configuration of adaptive integrated circuitry, to provide one or more operating modes or other functionality of ACE circuitry and other devices incorporating ACE technology. The method and systems of the invention combine configuration information with an ACE circuit (or ACE IC), for the provision of a selected operating mode. In addition, the system and method of the present invention are capable of determining ACE reconfiguration capability, providing secure and authorized configurations, and providing appropriate monitoring of configuration and content usage.

Yet additional advantages of the present invention may be further apparent to those of skill in the art. The ACE 100 architecture of the present invention effectively and efficiently combines and maximizes the various advantages of processors, ASICs and FPGAs, while minimizing potential disadvantages. The ACE 100 includes the programming flexibility of a processor, the post-fabrication flexibility of FPGAs, and the high speed and high utilization factors of an ASIC. The ACE 100 is readily reconfigurable, in advance, in real-time or at other rates, and is capable of having corresponding, multiple modes of operation. In addition, through the selection of particular functions for reconfigurable acceleration, the ACE 100 minimizes power consumption and is suitable for low power applications, such as for use in handheld and other battery-powered devices.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A system for adaptive configuration, the system comprising:
    a memory adapted to store configuration information including a first configuration information and a second configuration information;
    a first computational unit having a configurable basic architecture including a first plurality of heterogeneous computational elements and a first interconnection network configurably coupling the first plurality of heterogeneous computational elements together, the first interconnection network configuring interconnections between the first plurality of heterogeneous computational elements in response to the first configuration information to perform a basic computational function; and
    a second computational unit having a configurable complex processing architecture including a second plurality of heterogeneous computational elements and a second interconnection network configurably coupling the second plurality of heterogeneous computational elements together, the second interconnection network configuring interconnections between the second plurality of heterogeneous computational elements in response to the second configuration information to perform a complex processing function.

2. The system of claim 1, wherein the configuration information provides a first system operating mode of the plurality of operating modes.

3. The system of claim 1, wherein the first plurality of heterogeneous computational elements are configured to generate a request for the second configuration information.

4. The system of claim 1, wherein the memory comprises a third plurality of heterogeneous computational elements configured to perform a memory function in response to the configuration information.

5. The system of claim 1, wherein the configuration information is transferred to the system from a machine-readable medium or through a wireless interface.

6. The system of claim 1, wherein the configuration information is embodied as a plurality of discrete information data packets or as a stream of information data bits.

7. The system of claim 1, wherein the system is embodied within an integrated circuit.

8. The system of claim 1, wherein the computational units are organized in a configurable computing matrix and the computing matrix is coupled to a matrix interconnection network.

9. The system of claim 8, wherein the matrix interconnection network is coupled to a plurality of configurable computing matrices, each configurable computing matrix having a plurality of computational units.

10. The system of claim 9, wherein a first configured function of the configurable computing matrix is as a controller, and wherein the controller function includes sending configuration information via the matrix interconnection network to configure one of the plurality of configurable computing matrices.

11. The system of claim 8, wherein a first configured function of the configurable computing matrix is as a controller.

12. The system of claim 11, wherein the controller is a RISC controller.

13. The system of claim 1, wherein the first interconnection network operates as a Boolean interconnection network and a data interconnection network, the first interconnection network further allowing the transmission of data and configuration information.

14. The system of claim 13, wherein the matrix interconnection network transmits configuration information to the computing matrix to configure the computing matrix to perform the functions.

15. The system of claim 1, wherein the basic computational function is a logic function; and
wherein the complex processing function is a digital signal processing function.

16. The system of claim 15, wherein the first computational unit operates at a bit level; and
wherein the second computational unit operates at a word level.

17. The system of claim 16, wherein the basic computational function includes a function generator and an adder, an adder and a register, a function generator and a register, or a function generator and an adder and a register, the function generator having data inputs and a control input to selection a specific function; and
wherein the complex processing function includes a multiplier and an adder, a multiplier and a register, or a multiplier and an adder and a register.

18. The system of claim 1, wherein the basic computational function comprises bit level manipulation; and
wherein the complex processing function comprises word level manipulation.

19. The system of claim 18, wherein the basic computational function is a logic function; and
wherein the complex processing function is a digital signal processing function.

20. The system of claim 1, wherein the first plurality of heterogeneous computational elements includes a function generator and an adder, a register and an adder, a function generator and a register, or a function generator and an adder and a register, the function generator having data inputs and a control input to selection a specific function; and
wherein the second plurality of heterogeneous computational elements includes a multiplier and an adder, a multiplier and a register, or a multiplier and an adder and a register.

21. The system of claim 20, wherein the basic computational function is a logic function; and
wherein the complex processing function is a digital signal processing function.

22. The system of claim 21, wherein the basic computational function comprises bit level manipulation; and
wherein the complex processing function comprises word level manipulation.

23. The system of claim 1, wherein the basic computational function includes one of a group of linear operation, memory, memory management, and bit level manipulation; and
wherein the complex processing function is one of a group of fixed point arithmetic functions, floating point arithmetic functions, filter functions, and transformation functions.

24. The system of claim 23, wherein the basic computational function is a logic function; and
wherein the complex processing function is a digital signal processing function.

25. The system of claim 24, wherein the basic computational function comprises bit level manipulation; and
wherein the complex processing function comprises word level manipulation.

26. The system of claim 25, wherein the basic computational function includes a function generator and an adder, an adder and a register, a function generator and a register, or a function generator and an adder and a register, the function generator having data inputs and a control input to selection a specific function; and
wherein the complex processing function includes a multiplier and an adder, a multiplier and a register, or a multiplier and an adder and a register.

27. The system of claim 26, wherein the second plurality of heterogeneous computational elements each perform a function from the group of multiplication, addition, subtraction, accumulation, summation, byte passing, and dynamic shift.

28. The system of claim 1, further comprising a third interconnection network coupled to the first computational unit and the second computational unit, the third interconnection network sending the configuration information to the computational units.

29. The system of claim 28, wherein the first interconnection network has denser interconnections than the interconnections of the third interconnection network.

30. The system of claim 1, wherein the first interconnection network includes multiplexers coupled to the first plurality of heterogeneous computational elements, and the second interconnection network includes other multiplexers coupled to the second plurality of heterogeneous computational elements.

31. The system of claim 30, wherein the configuration information includes control signals to control the multiplexers.

32. A system for adaptive configuration, the system comprising:
a memory adapted to store configuration information including a first configuration information and a second configuration information;
a first configurable basic computational logic unit including a first plurality of heterogeneous computational elements and a first interconnection network for forming a first configurable architecture, the first interconnection network configurably coupling the first plurality of heterogeneous computational elements together; the first interconnection network configuring interconnections between the first plurality of heterogeneous computational elements in response to the first configuration information to perform a basic computational function; and
a second configurable complex processing unit including a second plurality of heterogeneous computational elements and a second interconnection network for forming a second configurable architecture, the second interconnection network configurably coupling the second plurality of heterogeneous computational elements together; the second interconnection network configuring interconnections between the second plurality of heterogeneous computational elements in response to the second configuration information to perform a complex processing function.

33. The system of claim 32, wherein the configuration information provides a first system operating mode of the plurality of operating modes.

34. The system of claim 32, wherein the first plurality of heterogeneous computational elements are configured to generate a request for the second configuration information.

35. The system of claim 32, wherein the memory comprises a third plurality of heterogeneous computational elements configured to perform a memory function in response to the configuration information.

36. The system of claim 32, wherein the configuration information is transferred to the system from a machine-readable medium or through a wireless interface.

37. The system of claim 32, wherein the configuration information is embodied as a plurality of discrete information data packets or as a stream of information data bits.

38. The system of claim 32, wherein the system is embodied within an integrated circuit.

39. The system of claim 32, wherein the logic unit and processing unit are organized in a configurable computing matrix and the configurable computing matrix is coupled to a matrix interconnection network.

40. The system of claim 39, wherein the matrix interconnection network is coupled to a plurality of configurable computing matrices, each configurable computing matrix having a plurality of logic and processing units.

41. The system of claim 40, wherein a first configured function of the configurable computing matrix is as a controller, and wherein the controller function includes sending configuration information via the matrix interconnection network to configure one of the plurality of configurable computing matrices.

42. The system of claim 39, wherein a first configured function of the configurable computing matrix is as a controller.

43. The system of claim 42, wherein the controller is a RISC controller.

44. The system of claim 32, wherein the first plurality of heterogeneous computational elements are organized as a basic computational architecture; and
wherein the second plurality of heterogeneous computational elements are organized as a complex processing architecture.

45. The system of claim 32, wherein the first interconnection network operates as a Boolean interconnection network and a data interconnection network, the first interconnection network further allowing the transmission of data and configuration information.

46. The system of claim 45, wherein the matrix interconnection network transmits configuration information to the computing matrix to configure the computing matrix to perform the functions.

47. The system of claim 32, wherein the basic computational function is a logic function; and
wherein the complex processing function is a digital signal processing function.

48. The system of claim 47, wherein the first configurable basic computational logic unit operates at a bit level; and
wherein the second configurable complex processing unit operates at a word level.

49. The system of claim 48, wherein the basic computational function includes a function generator and an adder, an adder and a register, a function generator and a register, or a function generator and an adder and a register, the function generator having data inputs and a control input to selection a specific function; and
wherein the complex processing function includes a multiplier and an adder, a multiplier and a register, or a multiplier and an adder and a register.

50. The system of claim 32, wherein the basic computational function comprises bit level manipulation; and
wherein the complex processing function comprises word level manipulation.

51. The system of claim 50, wherein the basic computational function is a logic function; and
wherein the complex processing function is a digital signal processing function.

52. The system of claim 32, wherein the first plurality of heterogeneous computational elements includes a function generator and an adder, a register and an adder, a function generator and a register, or a function generator and an adder and a register, the function generator having data inputs and a control input to selection a specific function; and
wherein the second plurality of heterogeneous computational elements includes a multiplier and an adder, a multiplier and a register, or a multiplier and an adder and a register.

53. The system of claim 52, wherein the basic computational function is a logic function; and
wherein the complex processing function is a digital signal processing function.

54. The system of claim 53, wherein the basic computational function comprises bit level manipulation; and
wherein the complex processing function comprises word level manipulation.

55. The system of claim 32, wherein the basic computational function includes one of a group of linear operation, memory, memory management, and bit level manipulation; and
wherein the complex processing function is one of a group of fixed point arithmetic functions, floating point arithmetic functions, filter functions, and transformation functions.

56. The system of claim 55, wherein the basic computational function is a logic function; and
wherein the complex processing function is a digital signal processing function.

57. The system of claim 56, wherein the basic computational function comprises bit level manipulation; and
wherein the complex processing function comprises word level manipulation.

58. The system of claim 57, wherein the basic computational function includes a function generator and an adder, an adder and a register, a function generator and a register, or a function generator and an adder and a register, the function generator having data inputs and a control input to selection a specific function; and
wherein the complex processing function includes a multiplier and an adder, a multiplier and a register, or a multiplier and an adder and a register.

59. The system of claim 58, wherein the second plurality of heterogeneous computational elements each perform a function from the group of multiplication, addition, subtraction, accumulation, summation, byte passing, and dynamic shift.

60. The system of claim 32, further comprising a third interconnection network coupled to the first configurable basic computational unit and the second configurable complex processing unit, the third interconnection network sending the configuration information to the units.

61. The system of claim 60, wherein the first interconnection network has denser interconnections than the interconnections of the third interconnection network.

62. The system of claim 32, wherein the first interconnection network includes multiplexers coupled to the first plurality of heterogeneous computational elements, and the second interconnection network includes other multiplexers coupled to the second plurality of heterogeneous computational elements.

63. The system of claim 62, wherein the configuration information includes control signals to control the multiplexers.

64. The system of claim 32, wherein the first interconnection network provides a third configuration information to reconfigure the first configurable basic computational unit to perform a second computational function, the memory being adapted to store the third configuration information.

65. A method for adaptive configuration of an integrated circuit, the method comprising:
receiving configuration information;
storing the configuration information in a memory; and
in response to the configuration information:
configuring interconnections between a first plurality of heterogeneous computational elements of the integrated circuit via a first interconnection network of the integrated circuit to provide a configurable basic computational unit to perform a basic computational function, the first interconnection network configurably coupling the first plurality of heterogeneous computational elements together; and
configuring interconnections between the second plurality of heterogeneous computational elements of the integrated circuit via the second interconnection network of the integrated circuit to provide a configurable complex computational unit to perform a complex processing function, the second interconnection network configurably coupling the second plurality of heterogeneous computational elements together.

66. The method of claim 65, further comprising requesting authorization to receive the configuration information.

67. The method of claim 65, wherein the configuration information provides a first system operating mode of the plurality of operating modes.

68. The method of claim 65, wherein the configuration information is received from a machine-readable medium or via a wireless interface.

69. The method of claim 65, wherein the computational units are organized in a configurable computing matrix and the configurable computing matrix is coupled to a matrix interconnection network.

70. The method of claim 69, wherein the matrix interconnection network is coupled to a plurality of configurable computing matrices, each configurable computing matrix having a plurality of computational units.

71. The method of claim 70, wherein a first configured function of the configurable computing matrix is as a controller, and wherein the controller function includes sending configuration information via the matrix interconnection network to configure one of the plurality of configurable computing matrices.

72. The method of claim 69, wherein a first configured function of the configurable computing matrix is as a controller.

73. The method of claim 72, wherein the controller is a RISC controller.

74. The method of claim 69, wherein the matrix interconnection network transmits configuration information to the computing matrix to configure the computing matrix to perform the functions.

75. The method of claim 65, wherein the first plurality of heterogeneous computational elements are organized as a basic computational architecture; and
wherein the second plurality of heterogeneous computational elements are organized as a complex processing architecture.

76. The method of claim 65, wherein the first interconnection network operates as a Boolean interconnection network and a data interconnection network, the first interconnection network further allowing the transmission of data and configuration information.

77. The method of claim 65, wherein the basic computational function is a logic function; and
wherein the complex processing function is a digital signal processing function.

78. The method of claim 77, wherein the configurable basic computational logic unit operates at a bit level; and
wherein the configurable complex processing unit operates at a word level.

79. The method of claim 78, wherein the basic computational function includes a function generator and an adder, an adder and a register, a function generator and a register, or a function generator and an adder and a register, the function generator having data inputs and a control input to selection a specific function; and
wherein the complex processing function includes a multiplier and an adder, a multiplier and a register, or a multiplier and an adder and a register.

80. The method of claim 65, wherein the basic computational function comprises bit level manipulation; and
wherein the complex processing function comprises word level manipulation.

81. The method of claim 80, wherein the basic computational function is a logic function; and
wherein the complex processing function is a digital signal processing function.

82. The method of claim 65, wherein the first plurality of heterogeneous computational elements includes a function generator and an adder, a register and an adder, a function generator and a register, or a function generator and an adder and a register, the function generator having data inputs and a control input to selection a specific function; and
wherein the second plurality of heterogeneous computational elements includes a multiplier and an adder, a multiplier and a register, or a multiplier and an adder and a register.

83. The method of claim 82, wherein the basic computational function is a logic function; and
wherein the complex processing function is a digital signal processing function.

84. The method of claim 83, wherein the basic computational function comprises bit level manipulation; and
wherein the complex processing function comprises word level manipulation.

85. The method of claim 65, wherein the basic computational function includes one of a group of linear operation, memory, memory management, and bit level manipulation; and
wherein the complex processing function is one of a group of fixed point arithmetic functions, floating point arithmetic functions, filter functions, and transformation functions.

86. The method of claim 85, wherein the basic computational function is a logic function; and
wherein the complex processing function is a digital signal processing function.

87. The method of claim 86, wherein the basic computational function comprises bit level manipulation; and
wherein the complex processing function comprises word level manipulation.

88. The method of claim 87, wherein the basic computational function includes a function generator and an adder, an adder and a register, a function generator and a register, or a function generator and an adder and a register, the function generator having data inputs and a control input to selection a specific function; and
wherein the complex processing function includes a multiplier and an adder, a multiplier and a register, or a multiplier and an adder and a register.

89. The method of claim 88, wherein the second plurality of heterogeneous computational elements each perform a function from the group of multiplication, addition, subtraction, accumulation, summation, byte passing, and dynamic shift.

90. The method of claim 65, further comprising a third interconnection network coupled to the configurable basic computational unit and the configurable complex computational unit, the third interconnection network sending the configuration information to the units.

91. The method of claim 90, wherein the first interconnection network has denser interconnections than the interconnections of the third interconnection network.

92. The method of claim 65, wherein the first interconnection network includes multiplexers coupled to the first plurality of heterogeneous computational elements, and the second interconnection network includes other multiplexers coupled to the second plurality of heterogeneous computational elements.

93. The method of claim 92, wherein the configuration information includes control signals to control the multiplexers.

94. The method of claim 65, wherein the first interconnection network provides a third configuration information to reconfigure the configurable basic computational unit to perform a second computational function, the memory being adapted to store the third configuration information.

95. A method for adaptive configuration of an integrated circuit, the integrated circuit having a first plurality of heterogeneous computational elements, a second plurality of heterogeneous computational elements, and an interconnection network coupled to the memory, the interconnection network having and a second interconnection network configurably coupling the second plurality of heterogeneous computational elements together, the method comprising:
transmitting configuration information;
wherein the configuration information is received;
storing the received configuration information in a memory; and
in response to the configuration information:
configuring interconnections between a first plurality of heterogeneous computational elements via a first interconnection network to provide a configurable basic computational unit to perform a basic computational function, the first interconnection network configurably coupling the first plurality of heterogeneous computational elements together; and
configuring interconnections between a second plurality of heterogeneous computational elements via a second interconnection network to provide a configurable complex computational unit to perform a complex processing function, the second interconnection network configurably coupling the second plurality of heterogeneous computational elements together.

96. The method of claim 95, further comprising requesting authorization to receive the configuration information.

97. The method of claim 95, wherein the configuration information provides a first system operating mode of the plurality of operating modes.

98. The method of claim 95, wherein the configuration information is received from a machine-readable medium or via a wireless interface.

99. The method of claim 95, wherein the computational units are organized in a configurable computing matrix and the configurable computing matrix is coupled to a matrix interconnection network.

100. The method of claim 99, wherein the matrix interconnection network is coupled to a plurality of configurable computing matrices, each configurable computing matrix having a plurality of computational units.

101. The method of claim 100, wherein a first configured function of the configurable computing matrix is as a controller, and wherein the controller function includes sending configuration information via the matrix interconnection network to configure one of the plurality of configurable computing matrices.

102. The method of claim 99, wherein a first configured function of the configurable computing matrix is as a controller.

103. The method of claim 102, wherein the controller is a RISC controller.

104. The method of claim 95, wherein the first plurality of heterogeneous computational elements are organized as a basic computational architecture; and
wherein the second plurality of heterogeneous computational elements are organized as a complex processing architecture.

105. The method of claim 95, wherein the first interconnection network operates as a Boolean interconnection network and a data interconnection network, the first interconnection network further allowing the transmission of data and configuration information.

106. The method of claim 105, wherein the matrix interconnection network transmits configuration information to the computing matrix to configure the computing matrix to perform the functions.

107. The method of claim 95, wherein the basic computational function is a logic function; and
wherein the complex processing function is a digital signal processing function.

108. The method of claim 107, wherein the configurable basic computational logic unit operates at a bit level; and
wherein the configurable complex processing unit operates at a word level.

109. The method of claim 108, wherein the basic computational function includes a function generator and an adder, an adder and a register, a function generator and a register, or a function generator and an adder and a register, the function generator having data inputs and a control input to selection a specific function; and
wherein the complex processing function includes a multiplier and an adder, a multiplier and a register, or a multiplier and an adder and a register.

110. The method of claim 95, wherein the basic computational function comprises bit level manipulation; and
wherein the complex processing function comprises word level manipulation.

111. The method of claim 110, wherein the basic computational function is a logic function; and
wherein the complex processing function is a digital signal processing function.

112. The method of claim 95, wherein the first plurality of heterogeneous computational elements includes a function generator and an adder, a register and an adder, a function generator and a register, or a function generator and an adder and a register, the function generator having data inputs and a control input to selection a specific function; and wherein the second plurality of heterogeneous computational elements includes a multiplier and an adder, a multiplier and a register, or a multiplier and an adder and a register.

113. The method of claim 112, wherein the basic computational function is a logic function; and wherein the complex processing function is a digital signal processing function.

114. The method of claim 113, wherein the basic computational function comprises bit level manipulation; and wherein the complex processing function comprises word level manipulation.

115. The method of claim 95, wherein the basic computational function includes one of a group of linear operation, memory, memory management, and bit level manipulation; and wherein the complex processing function is one of a group of fixed point arithmetic functions, floating point arithmetic functions, filter functions, and transformation functions.

116. The method of claim 115, wherein the basic computational function is a logic function; and wherein the complex processing function is a digital signal processing function.

117. The method of claim 116, wherein the basic computational function comprises it level manipulation; and wherein the complex processing function comprises word level manipulation.

118. The method of claim 116, wherein the basic computational function includes a function generator and an adder, an adder and a register, a function generator and a register, or a function generator and an adder and a register, the function generator having data inputs and a control input to selection a specific function; and wherein the complex processing function includes a multiplier and an adder, a multiplier and a register, or a multiplier and an adder and a register.

119. The method of claim 118, wherein the second plurality of heterogeneous computational elements each perform a function from the group of multiplication, addition, subtraction, accumulation, summation, byte passing, and dynamic shift.

120. The method of claim 95, further comprising a third interconnection network coupled to the configurable basic computational unit and the configurable complex computational unit, the third interconnection network sending the configuration information to the units.

121. The method of claim 120, wherein the first interconnection network has denser interconnections than the interconnections of the third interconnection network.

122. The method of claim 95, wherein the first interconnection network includes multiplexers coupled to the first plurality of heterogeneous computational elements, and the second interconnection network includes other multiplexers coupled to the second plurality of heterogeneous computational elements.

123. The method of claim 122, wherein the configuration information includes control signals to control the multiplexers.

124. The method of claim 95, wherein the first interconnection network provides a third configuration information to reconfigure the configurable basic computational unit to perform a second computational function, the memory being adapted to store the third configuration information.

* * * * *